(12) United States Patent
Gupta et al.

(10) Patent No.: US 9,973,879 B2
(45) Date of Patent: May 15, 2018

(54) OPPORTUNISTIC DECODING OF TRANSMISSIONS ON A FORWARD LINK IN A MACHINE-TO-MACHINE WIRELESS WIDE AREA NETWORK

(71) Applicant: QUALCOMM Incorporated, San Diego, CA (US)

(72) Inventors: Alok K. Gupta, San Diego, CA (US); Bin Tian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 682 days.

(21) Appl. No.: 13/685,602

(22) Filed: Nov. 26, 2012

(65) Prior Publication Data

US 2014/0146690 A1 May 29, 2014

(51) Int. Cl.
*H04W 52/02* (2009.01)
*H04W 4/00* (2018.01)

(52) U.S. Cl.
CPC ....... *H04W 4/005* (2013.01); *H04W 52/0216* (2013.01); *H04W 52/0219* (2013.01); *H04W 52/0229* (2013.01); *Y02D 70/00* (2018.01); *Y02D 70/142* (2018.01); *Y02D 70/21* (2018.01); *Y02D 70/22* (2018.01)

(58) Field of Classification Search
None
See application file for complete search history.

(56) References Cited

U.S. PATENT DOCUMENTS

| 7,200,186 B2 | 4/2007 | Schoenborn |
| 7,706,816 B2 | 4/2010 | Jang et al. |
| 2007/0060130 A1* | 3/2007 | Gogic et al. .................. 455/440 |
| 2007/0165558 A1* | 7/2007 | Jong ..................... H04L 1/0072 370/318 |
| 2007/0254679 A1* | 11/2007 | Montojo et al. ............. 455/458 |
| 2009/0323571 A1* | 12/2009 | Arvind .................. H04L 1/0083 370/311 |
| 2011/0134818 A1 | 6/2011 | Bae et al. |
| 2011/0140846 A1 | 6/2011 | Blanz et al. |
| 2011/0249605 A1 | 10/2011 | Kwon et al. |
| 2012/0045005 A1 | 2/2012 | Kim et al. |

(Continued)

FOREIGN PATENT DOCUMENTS

| CN | 101490993 A | 7/2009 |
| JP | 2007013544 A | 1/2007 |

(Continued)

OTHER PUBLICATIONS

International Search Report and Written Opinion—PCT/US2013/071470—ISAEPO—dated Mar. 31, 2014.

*Primary Examiner* — Huy D Vu
*Assistant Examiner* — Hong Shao
(74) *Attorney, Agent, or Firm* — Holland & Hart LLP

(57) ABSTRACT

Methods, systems, and devices are described for managing wireless communications in a machine-to-machine (M2M) wireless Wide Area Network (WAN). A packet is decoded and demodulated by an M2M device that is received during a time slot of a physical layer forward link frame in the M2M wireless WAN. The packet is transmitted by a base station. The M2M device enters a sleep state before a physical layer acknowledgment (ACK) message is transmitted to the base station to indicate receipt of the packet.

36 Claims, 15 Drawing Sheets

(56) References Cited

U.S. PATENT DOCUMENTS

| | | |
|---|---|---|
| 2012/0188997 A1 | 7/2012 | Zakrzewski et al. |
| 2012/0202543 A1* | 8/2012 | Murias et al. |
| 2013/0195072 A1* | 8/2013 | Zhu .............................. 370/330 |
| 2014/0003401 A1* | 1/2014 | Lim .................. H04W 72/0446 370/336 |

FOREIGN PATENT DOCUMENTS

| | | |
|---|---|---|
| WO | WO-2011098141 A1 | 8/2011 |
| WO | 2012077901 A1 | 6/2012 |
| WO | WO-2012074337 A2 | 6/2012 |

\* cited by examiner

OPPORTUNISTIC DECODING OF TRANSMISSIONS ON A FORWARD LINK IN A MACHINE-TO-MACHINE WIRELESS WIDE AREA NETWORK

BACKGROUND

The following relates generally to wireless communication, and more specifically to communications in a machine-to-machine (M2M) wireless wide area network (WAN). Wireless communications systems are widely deployed to provide various types of communication content such as voice, video, packet data, messaging, broadcast, sensor data, tracking data, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple devices. In some examples, these devices may be sensors and/or meters configured to collect data and transmit this data to an end server via a base station. These sensors and/or meters may be referred to as M2M devices. Communications between M2M devices and a base station may occur on forward and reverse links. Each base station has a coverage range, which may be referred to as the coverage area of the cell. An M2M device may transmit data to a base station on the reverse link. The base station may transmit data to the M2M device on the forward link.

When the base station successfully decodes data received on the reverse link, the base station may transmit an acknowledgment (ACK) message on the forward link to notify the M2M device that the data has been successfully received and decoded. Similarly, upon successfully receiving and decoding data on the forward link, the M2M device may be required to transmit an ACK message on the reverse link.

A single base station may communicate with a multitude of M2M devices. Transmitting an ACK message from each M2M device requires valuable bandwidth of the reverse link. In addition, power and other resources of the M2M device are needed in order to transmit an ACK message back to the base station on the reverse link. The transmission of ACK messages on the reverse link may result in an inefficient use of the power supply of M2M devices.

SUMMARY

The described features generally relate to one or more improved systems, methods, and/or apparatuses to minimize reverse link transmissions in a machine-to-machine (M2M) wireless wide area network (WAN). The present systems and methods may also conserve the power of an M2M device by minimizing the time the device is in an awake mode to receive forward link transmissions in the M2M wireless WAN. In one embodiment, reverse link control channels may be unavailable in the M2M wireless WAN in order to reduce reverse link transmissions. As a result, reverse link acknowledgment (ACK) channels are not available to transmit physical layer ACK messages on the reverse link. The unavailability of the reverse link control channels further reduces reverse link transmissions by eliminating the transmission of forward link channel status information using reverse link channels.

In one configuration, a method is described for managing wireless communications in an M2M wireless WAN. A packet may be decoded and demodulated by an M2M device that receives the packet during a time slot of a physical layer forward link frame in the M2M wireless WAN. The packet may be transmitted by a base station. The M2M device may enter a sleep state before a physical layer acknowledgment (ACK) message is transmitted to the base station to indicate receipt of the packet.

In one embodiment, entering the sleep state may include entering the sleep state with no transmission of the physical layer ACK message to the base station. In one configuration, no physical layer ACK message may be transmitted to the base station to indicate receipt of the packet after entering the sleep state.

In one example, the time slot of the physical layer forward link frame may be divided into a plurality of sub-slots. A copy of the packet is inserted into each of the plurality of sub-slots. In addition, at least one of the plurality of sub-slots is divided into a plurality of sub-channels. In one embodiment, the M2M device may remain in the sleep state while additional copies of the packet are transmitted from the base station. The additional copies of the packet may be transmitted during each of the plurality of sub-slots.

In one configuration, a pilot signal may be received from the base station. A strength of forward link communications transmitted from the base station may be determined using the pilot signal. In addition, a number of copies of the packet that are needed to demodulate the packet may be estimated. The estimation may be based at least in part on the determined strength of the forward link communications.

In one embodiment, the time slot may include a paging slot, an ACK slot, or a traffic slot of the physical layer forward link frame. The time slot of the physical layer forward link frame may be identified, and the M2M device may enter an awake mode during the identified time slot to receive the packet. One or more radios may be activated to receive the packet during the identified time slot. The one or more radios may be deactivated upon receipt of the packet. The one or more radios may be deactivated before additional copies of the packet are transmitted.

An M2M device configured for wireless communication in an M2M wireless WAN is also described. The device may include a processor and memory in electronic communication with the processor. Instructions may be stored in the memory. The instructions may be executable by the processor to decode and demodulate a packet received during a time slot of a physical layer forward link frame in the M2M wireless WAN. The packet may be transmitted by a base station. The instructions may also be executable by the processor to cause the M2M device to enter a sleep state before a physical layer acknowledgment (ACK) message is transmitted to the base station to indicate receipt of the packet.

An apparatus configured for wireless communication in an M2M wireless WAN is also described. The apparatus may include means for decoding and demodulating a packet received during a time slot of a physical layer forward link frame in the M2M wireless WAN. The packet may be transmitted by a base station. The apparatus may also include means for entering a sleep state before a physical layer acknowledgment (ACK) message is transmitted to the base station to indicate receipt of the packet.

A computer program product for managing wireless communication in an M2M wireless WAN is also described. The computer program product may include a non-transitory computer-readable medium storing instructions executable by a processor to decode and demodulate a packet received during a time slot of a physical layer forward link frame in the M2M wireless WAN. The packet may be transmitted by a base station. The instructions may also e executable by the processor to enter a sleep state before a physical layer acknowledgment (ACK) message is transmitted to the base station to indicate receipt of the packet.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices are described to conserve power of an M2M device by providing opportunistic decoding schemes of packets received by the M2M device on the forward link of an M2M wireless WAN. Traditional cellular systems may employ additional physical layer channels to facilitate reverse link communications between an M2M device and a base station. For example, reverse link control channels may be set up between the M2M device and the base station to carry physical layer ACK messages. Setting up these channels and transmitting physical layer ACK messages, however, requires bandwidth on the reverse link and power of the M2M device. In an M2M wireless WAN, conserving power of the M2M devices may be desirable. As a result, the traditional approach of cellular systems presents significant drawbacks for M2M wireless WANs.

To improve the power efficiency, an M2M device may minimize the amount of transmissions it makes on the reverse link. In addition, the device may also minimize its wake-up time as well as the time its radios are on to receive information transmitted from a base station on forward link channels.

Information may be transmitted to M2M devices during a forward link frame. The frame may include various slots to carry information for certain devices. Forward link transmissions that are slotted for different types of information (e.g., paging, data, etc.) may allow an M2M device to wake up and turn on its radio only during a certain slot that includes information intended for the M2M device. The device may capture a desired number of samples of the information, process the information, and return to a sleep state as soon as possible. Thus, the present systems and methods provide an early termination of reception on the forward link which is opportunistic as it takes advantage of an up-fade cycle and data rate variations within a coverage area of a base station. The present systems and methods also improve the power efficiency of an M2M device by minimizing the wake-up time of the device.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
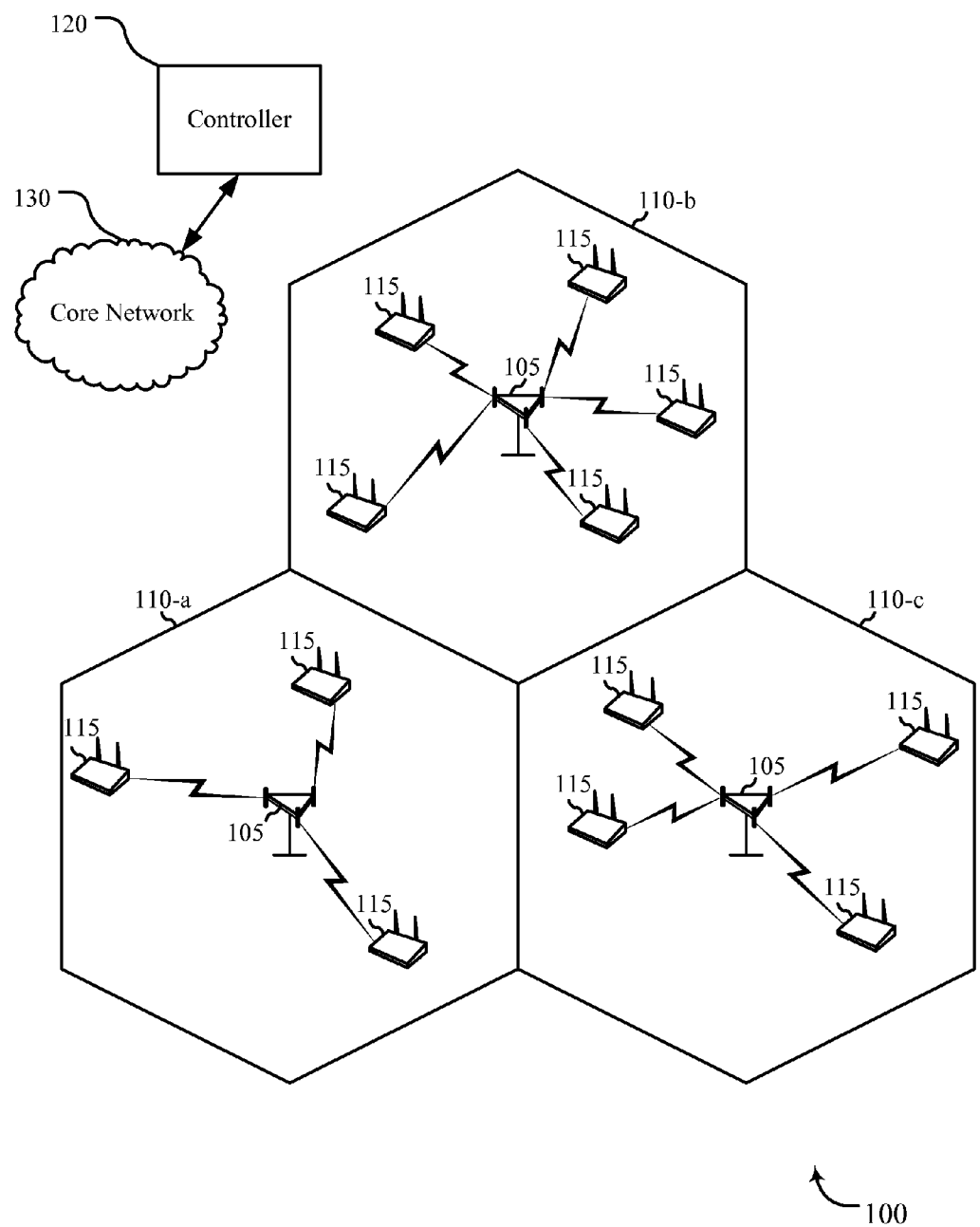
FIG. 1 shows a block diagram of a wireless communications system.

Referring first to FIG. 1, a block diagram illustrates an example of a wireless communications system 100. The system 100 includes base stations 105 (or cells), machine-to-machine (M2M) devices 115, a base station controller 120, and a core network 130 (the controller 120 may be integrated into the core network 130). The system 100 may support operation on multiple carriers (waveform signals of different frequencies).

The base stations 105 may wirelessly communicate with the M2M devices 115 via a base station antenna (not shown). The base stations 105 may communicate with the M2M devices 115 under the control of the base station controller 120 via multiple carriers. Each of the base station 105 sites may provide communication coverage for a respective geographic area. The coverage area for each base station 105 here is identified as 110-*a*, 110-*b*, or 110-*c*. The coverage area for a base station may be divided into sectors (not shown, but making up only a portion of the coverage area). The system 100 may include base stations 105 of different types (e.g., macro, pico, and/or femto base stations). A macro base station may provide communication coverage for a relatively large geographic area (e.g., 35 km in radius). A pico base station may provide coverage for a relatively small geographic area (e.g., 10 km in radius), and a femto base station may provide communication coverage for a relatively smaller geographic area (e.g., 1 km in radium). There may be overlapping coverage areas for different technologies.

The M2M devices 115 may be dispersed throughout the coverage areas 110. Each M2M device 115 may be stationary or mobile. In one configuration, the M2M devices 115 may be able to communicate with different types of base stations such as, but not limited to, macro base stations, pico base stations, and femto base stations. The M2M devices 115 may be sensors and/or meters that monitor and/or track other devices, environmental conditions, etc. The information collected by the M2M devices 115 may be transmitted across a network that includes a base station 105 to a back-end system, such as a server. The transmission of data to/from the M2M devices 115 may be routed through the base stations 105. The base stations 105 may communicate with the M2M devices on a forward link. In one configuration, the base stations 105 may generate a forward link frame with a number of time slots that include channels to carry data and/or messages to an M2M device 115. In one example, each forward link frame may include no more than three time slots and one or more corresponding channels. These slots and channels may include a paging slot with a paging channel, an ACK slot with an ACK channel, and a traffic slot with a traffic channel. The length of an individual frame may be short (e.g., 20 milliseconds (ms)). In one embodiment, four frames may be joined to form a larger frame with a duration of 80 ms. Each frame included in the larger frame may include no more than three time slots and channels such as the paging slot for the paging channel, the ACK slot for the ACK channel, and the traffic slot for the traffic channel. The paging and ACK slots of each frame may each have a length of 5 ms while the traffic slot of each frame may have a length of 10 ms. An M2M device 115 may wake up during the individual frames (within the larger frame) that include data and/or messages on its channels that are intended for that M2M device 115.

In one configuration, an M2M device 115 may transmit one or more copies of a packet to a base station 105 on a reverse link. The base station 105 may transmit an ACK message on the forward link to notify the M2M device that the packet has been decoded by the base station 105. The M2M device 115 may continue to transmit copies of the packet until an ACK message is received, at which time the M2M device 115 may cease the transmission of copies of the packet.

In one embodiment, a reverse link control channel may be unavailable. The reverse link control channel may be used to carry an ACK message from the M2M device 115 to the base station 105 to indicate that the M2M device 115 has successfully received information from the base station 105. Because the reverse link control channel is unavailable, ACK messages may not be transmitted on the reverse link to the base station 105. As a result, the M2M device 115 may conserve power by not transmitting physical layer ACK messages.

In one embodiment, M2M devices 115 may be incorporated in other devices or the M2M devices 115 may be standalone devices. For example, devices such as cellular phones and wireless communications devices, personal digital assistants (PDAs), other handheld devices, netbooks, notebook computers, surveillance cameras, handled medical scanning devices, home appliances, etc. may include one or more M2M devices 115.

In one example, the network controller 120 may be coupled to a set of base stations and provide coordination and control for these base stations 105. The controller 120 may communicate with the base stations 105 via a backhaul (e.g., core network 125). The base stations 105 may also communicate with one another directly or indirectly and/or via wireless or wireline backhaul.

Figure 2:
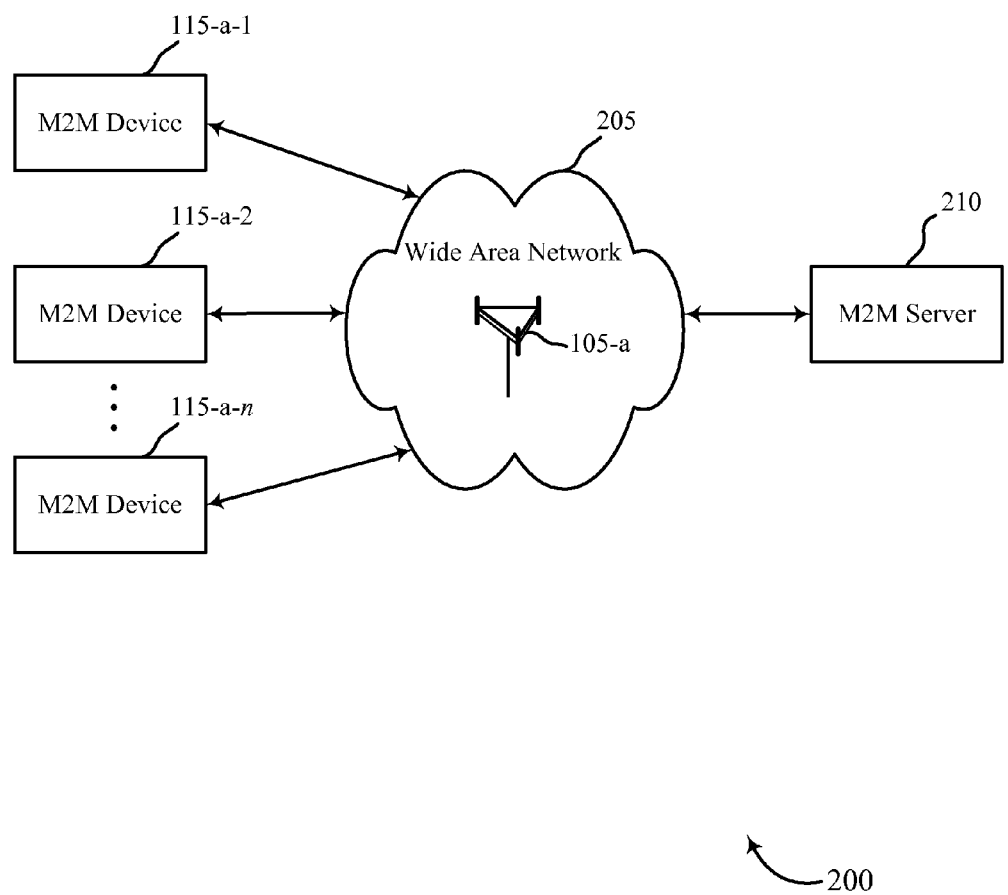
FIG. 2 illustrates an example of a wireless communication system including a wireless wide area network (WAN) implementing M2M communications.

FIG. 2 illustrates an example of a wireless communication system 200 including a wireless wide area network (WAN) 205 implementing an M2M service according to one aspect. The system 200 may include a number of M2M devices 115-*a* and an M2M server 210. Communications between the server 210 and M2M devices 115 may be routed through a base station 105, which may be considered part of the WAN 205. The base station 105-*a* may be an example of the base stations illustrated in FIG. 1. The M2M devices 115-*a* may be examples of the M2M devices 115 illustrated in FIG. 1. One skilled in the art would understand that the quantity of M2M devices 115-*a*, WANs 205, and M2M servers 210 shown in FIG. 2 is for illustration purposes only and should not be construed as limiting.

The wireless communication system 200 may be operable to facilitate M2M communications. M2M communications may include communications between one or more devices without human intervention. In one example, M2M communications may include the automated exchange of data between a remote machine, such as an M2M device 115-*a*, and a back-end IT infrastructure, such as the M2M server 210, without user intervention. The transfer of data from an M2M device 115-*a* to the M2M server 210 via the WAN 205 (e.g., the base station 105-*a*) may be performed using reverse link communications. Data collected by the M2M devices 115-*a* (e.g., monitoring data, sensor data, meter data, etc.) may be transferred to the M2M server 210 on the reverse link communications.

The transfer of data from the M2M server 210 to an M2M device 115-*a* via the base station 105-*a* may be performed via forward link communications. The forward link may be used to send instructions, software updates, and/or messages to the M2M devices 115-*a*. The instructions may instruct the M2M devices 115-*a* to remotely monitor equipment, environmental conditions, etc. M2M communications may be used with various applications such as, but not limited to, remote monitoring, measurement and condition recording, fleet management and asset tracking, in-field data collection, distribution, and storage, etc. The base station 105-*a* may generate one or more forward link frames with a small number of time slots with channels to transmit instructions, software updates, and/or messages. The various M2M devices 115-*a* may wake up during the time slots of a specific frame when instructions or other data is included on a channel during the time slots of that frame. Typically, the base station 105-*a* may transmit packets of information to more than one M2M device 115. Each device 115 may transmit a physical layer ACK message on the reverse link communications upon receiving the packet. The transmission of ACK messages on the reverse link from multiple M2M devices 115 may cause each M2M device 115 to consume an unnecessary amount of power. As a result, the present systems and methods may allow the M2M devices 115 to wake-up during a specific slot, receive a packet of information, and return to a sleep state without transmitting a physical layer ACK message on the reverse link.

In one configuration, different types of M2M communications may be proposed in different wireless access networks that use different addressing formats. Different addressing formats may lead to different types of M2M devices 115-*a* being used for different services. In one aspect, an M2M network may be implemented which may maintain the M2M devices 115-*a* independent of the WAN technology that is used to communicate with the M2M server 210. In such an aspect, the M2M devices 115-*a* and the M2M server 210 may be made independent of the WAN technology that is used. As a result, a WAN technology used for backhaul communication may be replaced with a different WAN technology, without affecting the M2M devices 115-*a* that may already be installed. For example, the M2M server 210 and an M2M device 115-*a* may communicate with each other irrespective of the addressing format used by the WAN technology since the addressing format used by the M2M device 115-*a* may not be tied with the addressing used by the implemented WAN technology.

In one embodiment, the behavior of the M2M devices 115-*a* may be pre-defined. For example, the day, time, etc. to monitor another device and transmit the collected information may be pre-defined for an M2M device 115-*a*. For example, the M2M device 115-*a*-1 may be programmed to begin monitoring another device and collect information about that other device at a first pre-defined time period. The device 115-*a*-1 may also be programmed to transmit the collected information at a second pre-defined time period. The behavior of an M2M device 115-*a* may be remotely programmed to the device 115-*a*. Data rates and duty cycles used to transmit paging messages may be flexible depending on various conditions. Details regarding dynamically changing data rates used to transmit paging messages will be described below.

Figure 3A:
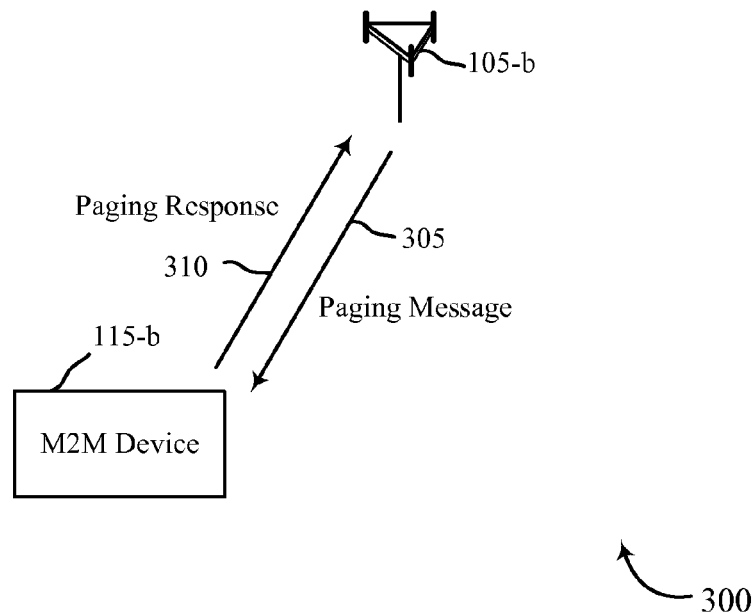
FIG. 3A shows a block diagram illustrating one embodiment of a paging system.

FIG. 3A is a block diagram illustrating one embodiment of a paging system 300 including a base station 105-*b* and an M2M device 115-*b*. The base station 105-*b* may be an example of the base stations 105 of FIG. 1 or 2. The M2M device 115-*b* may be an example of the M2M devices 115 of FIG. 1 or 2.

In a wireless communication system, such as the systems of FIG. 1 or 2, the notions of sleep state and paging are important to provide network connectivity to a large population of devices (e.g., M2M devices 115) in a battery power and air link resource efficient manner. A sleep state may provide the M2M device 115-*b* with a mode of operation to minimize battery power consumption by shutting down the whole or a part of the devices' transmit/receive circuitry. In addition, an M2M device 115-*b* in the sleep state may not be allocated any dedicated air link resource and therefore a large number of M2M devices may be simultaneously supported. During time intervals where the M2M device 115-*b* has no traffic activity, the device 115-*b* may remain in the sleep state to conserve resources.

Paging may involve the M2M device 115-*b* waking up periodically from the sleep state, and having the M2M device 115-*b* operate to receive and process a paging message 305 on the forward link communications (e.g., communications from the base station 105-*b* to the M2M device 115-*b*). The base station 105-*b* may be aware when the M2M device 115-*b* should wake up. Thus, if the base station 105-*b* intends to contact, or page, the M2M device 115-*b*, the base station 105-*b* may send the paging message 305 in a paging channel during all or a portion of one or more paging slots of a forward link frame at the time when the M2M device 115-*b* is scheduled to wake up and monitor the paging channel. The base station 105-*b*, however, may not be aware of the signal strength of each M2M device 115 in the M2M wireless WAN. As a result, the base station 105-*b* may transmit paging messages at a high data rate using a first paging channel. If the M2M device 115-*b* is unable to properly demodulate the paging message 305 because the signal strength of the device 115-*b* is too low, the base station 105-*b* may dynamically change the data rate used to transmit the message to the device 115-*b*. In addition, the base station 105 may increase the frequency it transmits the paging message 305 and the device 115-*b* may increase the frequency it wakes up to monitor for the paging message 305 sent at the lower data rate. In one configuration, if the base station 105-*b* does not receive a paging response 310 confirming that the M2M device 115-*b* has received the paging message, the base station 105-*b* may retransmit the paging message 305 on a second paging channel during the paging slot more frequently and at a lower data rate. The base station 105-*b* may retransmit the paging message 305 until either the M2M device 115-*b* receives the paging message 305 and transmits a paging response 310 and/or a certain number of transmissions of the paging message 305 have occurred. If one or both of these events occur, the base station 105-*b* and the M2M device 115-*b* may return to operate under the previous paging cycle and the base station 105-*b* may return to transmit paging messages to the device 115-*b* at a high data rate using the first paging channel.

The time interval between two successive wake-up periods of an M2M device 115-*b* may be referred to as a paging cycle. The M2M device 115-*b* may operate in a sleep state during the portion of the paging cycle when the M2M device 115-*b* is not performing processing related to receiving a paging message 305. In order to maximize the benefit of the sleep state, the paging system 300 may use a long paging cycle. For example, in a data system, the paging cycle may be about 5 minutes. As mentioned above, if the base station 105-*b* does not receive the paging response 310 indicating the successful receipt of the paging message 305, the base station 105-*b* may retransmit the paging message 305 using a smaller paging cycle until the paging response 310 is received. The retransmission of the paging message 305 may occur using the same channel or a different channel. Further, the M2M device 115-*b* may wake up more periodically (i.e., shorter paging cycle) to monitor paging slots of frames for the paging message 305.

In one embodiment, the paging channel used during the paging slot of a frame may have sufficient bandwidth to carry a number of paging messages 305. In one example, the paging channel may carry less than the maximum amount of paging messages 305. The base station 105-*b* may insert system information into the extra, unused bandwidth of the paging channel during the paging slot. The system information may be used by a number of M2M devices 115 to acquire the timing of the signals transmitted from the base station 105-b. Reusing the paging channel to transmit system information avoids the need to set up additional channels during additional time slots of the forward link frames to carry such information (which may increase the overall length of a forward link frame). As a result, M2M devices 115 may conserve power by minimizing the amount of time they are in an awake mode. By reusing the paging channel, the time slots of the frames transmitted on the forward link may be kept short, allowing the M2M devices 115 to return to the sleep mode as quickly as possible.

Upon receiving the paging message 305, the M2M device 115-b may carry out any operations specified in the paging message 305. In one example, the M2M device 115-b may receive the paging message 305 and go back to the sleep state without transmitting a physical layer ACK message to the base station 105-b to indicate that the paging message had been received. Alternatively, the M2M device 115-b may access the base station 105-b to establish an active connection with the base station 105-b.

Figure 3B:
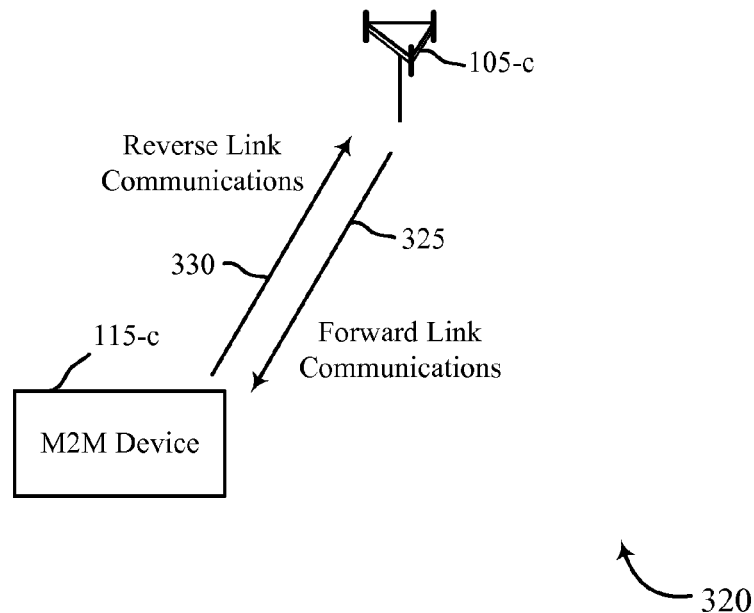
FIG. 3B is a block diagram illustrating one embodiment of a wireless communications system.

FIG. 3B is a block diagram illustrating one embodiment of a wireless communications system 320. The system 320 may include a base station 105-c and an M2M device 115-c. The base station 105-c and the M2M device 115-c may be examples of the base stations and M2M devices of FIG. 1, 2, or 3A. In one configuration, the base station 105-c may communicate with the M2M device 115-c using a forward link frame with a limited number of time slots for logical channels used for forward link communications 325. The M2M device 115-c may communicate with the base station 105-c using reverse link communications 330. Communications that occur using the forward and reverse link communications may be M2M communications, as described above. These communications may take various forms, depending principally on the air interface protocol used by the base station 105-c and the M2M device 115-c.

The base station 105-c may be arranged to communicate on one or more carrier frequencies, typically using a pair of frequency bands to define the forward and reverse links communications, respectively. The base station 105-c may also include a set of directional antenna elements arranged to define multiple cell sectors. M2M communications in each sector on a given carrier frequency may be distinguished from communications in other sectors by modulating the communications in the given sector with a sector-specific code, such as a pseudo-random noise offset ("PN offset"). Further, M2M communications in each sector may be divided into control and traffic channels, each of which may be defined through time division multiplexing (TDM).

In one embodiment, signals may be transmitted on the forward link communications 325 and the reverse link communications 330 in a frame format. Within the frame format, information may be packetized and formatted according to the actual payload data to be communicated over the communication links 325, 330. In one configuration, the format of a frame transmitted on the forward link communications 325 may include various time slots for various channels. In one embodiment, the frame may include a paging slot for the paging channel, an ACK slot for the ACK channel, and a traffic slot for the traffic channel. As mentioned above, paging messages 305 and/or system information may be transmitted in the paging channel (according to the paging cycle) to the M2M device 115-c during a paging slot. ACK message may be transmitted in the ACK channel to an M2M device during the ACK time slot when a signal or data is successfully decoded and demodulated at the base station 105-c. Traffic data may be transmitted in the traffic channel to the M2M device 115-c during the traffic time slot. Frames used on the forward link communications 325 in M2M communications may be based on a short duty cycle.

To conserver power, an M2M device 115 may wake up only during specific time slots of specific forward link frames to receive data, paging messages 305, etc. As a result, the frame structure in M2M communications may be slotted for each M2M device. Thus, each device 115 may only be required to wake up for the slot of the frame that is needed to retrieve its data. In one embodiment, a time slot of a forward link frame may be divided into multiple sub-slots. The base station 105-c may transmit a copy of a packet during each sub-slot. When a device 115 decodes and demodulates a packet on the forward link communications 325 during one of the sub-slots, the device 115 may return to the sleep state before transmitting an ACK message to the base station indicating that a copy of the packet was received. In one example, the device 115 may not transmit any physical layer ACK message to the base station 105-c. As a result, power may be conserved at the M2M device 115 by eliminating the transmission of ACK messages back to the base station 105-c. The base station 105-c may continue to transmit the remaining copies during the remaining sub-slots even though the M2M device 115 has returned to the sleep state.

Each copy of the packet may be transmitted using a sub-channel of the sub-slot at a high data rate. In one configuration, the M2M device 115-c may estimate the number of copies of the packet that will be required to be transmitted from the base station 105-c before the M2M device 115 is able to successfully decode and demodulate a copy of the data packet. This estimation may be based on the received signal strength of a pilot signal transmitted from the base station 105-c.

In one embodiment, the reverse link communications 330 may be terminated early to conserve the battery power of the M2M device 115-c and air interface resources between the M2M device 115-c and the base station 105-c. As stated above, a forward link frame may include an ACK slot during which an ACK message may be transmitted from the base station 105-c. The channel used to transmit the ACK message during the slot may be a random access channel. The base station 105-c may use the channel to carry ACK messages that acknowledge the reception of a reverse link physical layer packet sent from the M2M device 115-c using the reverse link communications 330. In one configuration, a greater number of ACK messages may be transmitted in an ACK packet when the conditions of the forward link frame appear to be favorable. This may include identifying a number of copies of a packet an M2M device must transmit on the reverse link communication 330 until it is successfully decoded by the base station. Similarly, a smaller number of ACK messages may be transmitted in an ACK packet when the conditions of the forward link do not appear to be as favorable. Increasing and decreasing the number of ACK messages in a packet effectively changes the data rate that is used to transmit an ACK message to an M2M device. As a result, rather than sending every ACK message at the lowest data rate, some ACK messages may be sent at a higher data rate on the forward link. When ACKs (i.e., ACK messages) are transmitted at higher data rates to the M2M device 115-c, the device 115-c may receive and decode the ACKs more quickly, thus increasing the forward link ACK throughput and terminating the reverse link communications 330 at an earlier time period than if the ACKs was transmitted using a low data rate.

In one configuration, the operating band of the reverse link communications 330 may be divided into multiple reverse link frequency channels. Within each frequency channel, CDMA techniques may be used to multiplex the reverse link communications for multiple M2M devices 115. In one example, each reverse link frequency channel may have its own rise over thermal (ROT) operation point. At least one frequency channel may be dedicated as a low data rate random access channel. Dividing the operating band of the reverse link communications 330 may provide a low ROT operation target (e.g., 1 decibel (dB) or less) for reverse link communications. A low ROT may reduce the link budget requirement for those devices in locations with large path loss.

In one example, to increase the power efficiency of the M2M device 115-c, a narrowband frequency-division multiple access (FDMA) technique may be used for the reverse link communications 330. This technique may include dividing the operating band of the reverse link communications 330 into a number of narrowband frequency channels. The base station 105-c may broadcast the status and assignment of each narrowband channel to each M2M device 115. The status may be "busy" or "idle". In one embodiment, the M2M device 115-c may only transmit data if a narrowband frequency channel is assigned to the device 115-c. The early termination of the reverse link communications 330 (described above) may be incorporated into the narrowband FDMA technique to exploit the signal-to-interference noise ratio (SINR) distribution and to support multiple data rates in the reverse link communications 330.

Figure 4A:
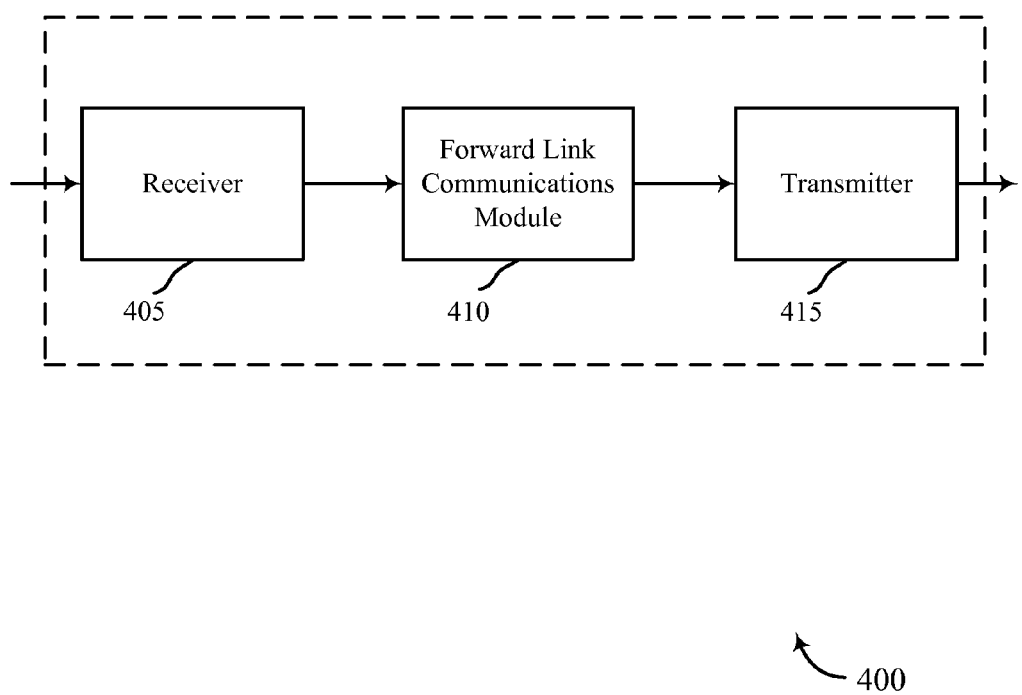
FIG. 4A is a block diagram illustrating a device for managing forward link communications in accordance with various embodiments.

Turning next to FIG. 4A, a block diagram illustrates a device 400 for managing forward link communications in accordance with various embodiments. The device 400 may be an example of one or more aspects of base stations 105 described with reference to FIGS. 1, 2, 3A, and/or 3B. The device 400 may also be a processor. The device 400 may include a receiver module 405, a forward link communications module 410, and/or a transmitter module 415. Each of these components may be in communication with each other.

These components of the device 400 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405 may receive information such as packet, data, and/or signaling information regarding what the device 400 has received or transmitted. The received information may be utilized by the forward link communications module 410 for a variety of purposes.

The receiver module 405 may be configured to receive a reverse link physical layer packet sent from an M2M device 115 using reverse link communications 330. The receiver module 405 may also be configured to receive instructions, a set of operations, messages, etc. from a back-end server to communicate to an M2M device 115. The forward link communications module 410 may generate one or more forward link frames. The frames may be short duty cycle frames that include a minimal number of time slots during which information may be transmitted using logical channels. The forward link frames may be slotted for communications with multiple M2M devices. Details regarding the forward link frame will be described below.

The forward link communications module 410 may generate an ACK message indicating a packet has been successfully received and decoded on the reverse link 330. The transmitter module 415 may be configured to transmit the ACK message in the forward link frame to the M2M device 115. Instead of transmitting ACKs in a channel of the forward link frame at the lowest data rate, the ACKs may be transmitted at a higher data rate, resulting in early termination of communications received on the reverse link 330 by the receiver 405, as previously described.

In one embodiment, the forward link communications module 410 may generate a number of paging messages 305 to transmit to a number of M2M devices 115 via the transmitter module 415. The paging messages 305 may alert specific M2M devices 115 that a base station 105 is requesting the M2M device 115 to make contact with the base station 105. In one configuration, paging messages 305 may be transmitted in the paging channel (or a sub-channel of the paging channel) during the paging time slot at different data rates, depending on whether the M2M device 115 successfully demodulates a paging message.

In one configuration, the paging channel may include less than the maximum number of paging messages 305. If the paging channel does not include the maximum number of paging messages 305, the paging slot may be determined to idle. The unused capacity of the paging channel may be utilized by inserting system information into the paging channel. The system information may then be broadcast to the M2M devices 115 in the paging channel during the paging time slot of the forward link frame. Additional channels and time slots are avoided in forward link frames to transmit this type of information. Instead, idle paging time slots may be reused to transmit system information.

The receiver module 405 may receive a paging response 310 when the M2M device 115 successfully decodes the paging message 305. When the receiver module 405 does not receive the paging response 310, the forward link communications module 410 may be configured to instruct the transmitter module 415 to retransmit the paging message 305. The transmitter module 415 may retransmit the message 305 at a lower data rate and at a higher frequency than the original transmission of the paging message 305. The transmitter module 415 may cease the retransmission when a paging response 310 is received by the receiver module 405 and/or after a certain number of retransmissions of the message 305 have been transmitted. The transmitter module 415 may transmit and retransmit the paging messages 305 on different sub-paging channels of different forward link frames. In one configuration, when the paging channel is not needed to transmit a paging message 305, the forward link communications module 410 may generate and insert system information into the paging channel of the forward link frame. The transmitter module 415 may transmit the system information to an M2M device 115 in the paging channel of the frame. In one configuration, the transmitter 415 may transmit information using multiple paging channels of multiple frames. Paging messages may be transmitted in different paging channels at different data rates and at different paging cycles.

Figure 4B:
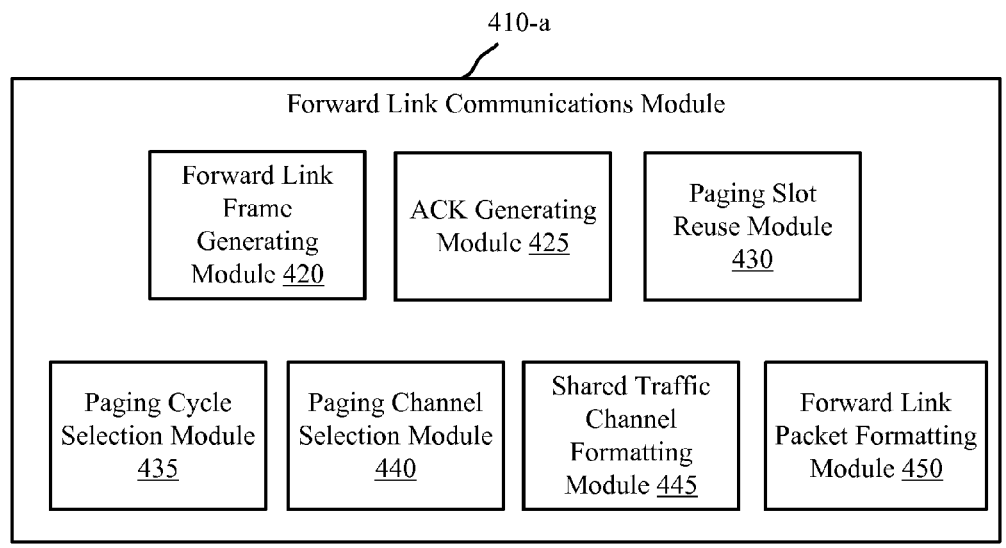
FIG. 4B is a block diagram illustrating one embodiment of a forward link communications module.

FIG. 4B is a block diagram illustrating one embodiment of a forward link communications module 410-a. The module 410-a may be an example of the forward link communications module of FIG. 4A. In one example, the module 410-*a* may include a forward link frame generating module 420, an ACK generating module 425, a paging slot reuse module 430, a paging cycle selection module 435, a paging channel selection module 440, a shared traffic channel formatting module 445, and a forward link packet formatting module 450.

The forward link frame generating module 420 may generate a physical layer frame to be used for communications on the forward link 325 (e.g., from a base station to an M2M device). The generated frame may be based on a short duty cycle and a small number of slotted physical layer channels. For example, the module 420 may generate a forward link physical layer frame that is a total of 20 milliseconds (ms). The slotted operation of the frame generated by the module 420 may allow the M2M device 115 to wake up and turn on its radio only during the scheduled time slot of the frame where it is expecting data. As a result, the M2M device 115 may be in the awake mode for less than the length of the frame.

Each of the physical channels of the forward link frame may include both pilot symbols and data symbols, which may be time division multiplexed (TDM). In one configuration, a forward link frame generated by the module 420 may include a paging slot, an ACK slot, and a traffic slot. Paging messages and other information may be transmitted in a paging channel to an M2M device 115 on the forward link communications 325 during the paging time slot. ACK messages and additional information may be transmitted in an ACK channel (e.g., a random access channel) during the ACK slot. Data messages may be transmitted in a traffic channel to an M2M device 115 during the traffic slot.

The ACK generating module 425 may generate an ACK message to transmit on the forward link communications 325. The message may be transmitted in an ACK channel that is part of the forward link frame generated by the forward link frame generating module 420. In one configuration, the channel may be used to transmit multiple ACKs in an ACK packet. Each ACK in the packet may be an identifier (ID) of an M2M device 115. The ID may be a network ID of an M2M device. In addition, the ID may be a compressed version of the network ID. For example, a compressed ID may be a hash of the network ID of the M2M device 115. In one configuration, the ACK generating module 425 may group the multiple ACKs to create the ACK packet. In one embodiment, ACK packets may include different quantities of ACKs depending on the channel conditions of the forward link.

In some instances, a paging slot may be idle for a certain forward link frame. For example, the capacity of the paging channel during the paging slot may not be at full capacity. For instance, the paging slot may not be scheduled to transmit a paging message 305 for an M2M device 115. As a result, the paging channel may be empty (e.g., no paging messages 305). The paging slot reuse module 430 may reuse the idle paging slot to communicate system information to the M2M device 115. The system information may include system timing and sector number information and may be inserted into the paging channel for transmission to the M2M devices 115 during the paging time slot. Thus, the establishment of additional channels within the forward link frame to convey the system information to an M2M device 115 may be avoided. Instead, the paging slot reuse module 430 may insert the system information in an idle paging channel during the paging slot of the frame.

In one embodiment, the paging cycle selection module 435 may select a particular paging cycle to transmit paging messages to an M2M device. The module 435 may provide a flexible paging scheme to dynamically change the paging cycle for an M2M device 115 in an M2M wireless WAN. The paging cycle selection module 435 may dynamically change the paging cycle depending on whether a paging response 310 is received from the device 115, the time of day, the state of operation of the M2M device 115, etc.

In one configuration, the paging channel selection module 440 may select between sub-channels of the paging channel to transmit a paging message to an M2M device 115 using the forward link communications 325. For example, the selection module 440 may select between a primary and secondary paging channel. The module 440 may provide a paging scheme that allows for paging messages to be transmitted at different data rates in an M2M wireless WAN using primary and secondary paging channels. The primary paging channel may be used for longer paging cycles while the secondary paging channel may be used for shorter paging cycles. In one configuration, the paging channels may be code division multiple access (CDMA) channels. In one example, the paging channels may be time division multiple access (TDMA) channels.

The shared traffic channel formatting module 445 may format a traffic channel in the forward link frame that may be shared by multiple M2M devices. When a M2M device 115 is expecting data on a shared traffic channel within a given traffic channel cycle, the device 115 may continue reading the traffic channel slots across multiple forward link frames during a traffic channel cycle until it finds its data as indicated by the ID field. As a result, the M2M device 115 may stay awake longer than necessary to find its data. The formatting module 445 may format the traffic channel in such a way so as to minimize the wake up time for the M2M device 115. The M2M device 115 may determine which slot of a particular frame to wake up in order to get its data on the shared traffic channel. To determine which slot to wake up for, the M2M device may use a set of hashing function on its ID. The M2M device may also use the number of slots at the expected data rate and the total number of users at that rate to determine the slot where it can expect to receive its data. The traffic channel may be formatted by the module 445 to allow the device to determine which slot to use. For example, the module 445 may format the shared traffic channel so that the hashed slot either contains the data or a pointer to a slot where the actual data is located. If a slot of a first frame cannot contain all the pointers, the module 445 may set an overflow flag and provide a pointer to another slot of another frame where the hashed M2M device can check for its data. If all the data for the M2M device 115 cannot be accommodated during a single slot, then the module 445 may format a trailer field of the channel to include a pointer to another slot where the remaining data is transmitted.

The forward link packet formatting module 450 may format a packet to be transmitted on the forward link communications 325. In one example, the module 450 may create multiple copies of the packet. In addition, the module 450 may insert a single copy of the packet into a sub-slot of a time slot in a forward link frame. In one embodiment, a time slot (e.g., paging slot, ACK slot, traffic slot) of a forward link frame may be divided in a number of sub-slots. The forward link packet formatting module 450 may insert a single copy of the packet into each of the generated sub-slots. In one configuration, the channel used to carry the packet during the time slot may also be divided into a number of sub-channels. As a result, a sub-channel may be used during each sub-slot to carry the copy of the packet on the forward link communications 325. Each sub-channel may be used to transmit the copies of the packet at a high data rate.

The packet format may vary depending on the time slot (e.g., paging, ACK, traffic) during which the packet is transmitted on the forward link. For example, during a paging slot, copies of the packet may be transmitted at 20 kilo bits per second (kbps). Each copy of the packet may include 100 bits (84 bits of data, 8 tail bits, and 8 bits for cyclic redundancy check (CRC)). QPSK modulation schemes may be used and a copy of the packet may be transmitted for 5 ms. As a result, 4 repeat copies of the packet may be transmitted. As another example, during a paging slot, the packet may be transmitted at 10 kbps. The packet may include 50 bits (42 bits of data, 8 bits for CRC). BPSK modulation may be used. The packet may be transmitted for 5 ms and 4 repeat copies of the packet may be transmitted.

If the packet is transmitted during an ACK slot of the forward link frame, it may be transmitted at 20 kbps and may include 100 bits (92 bits for data, 8 tail bits). QPSK may be the modulation scheme and the packet may be transmitted for 5 ms. As a result, 4 repeat copies of the packet may be transmitted. In another embodiment, the packet may be transmitted at 10 kbps. The packet may include 50 bits of data. BPSK may be the modulation used and the packet may be transmitted for 5 ms. In one example, 4 repeat copies of the packet may also transmitted during the ACK slot.

A packet may further be transmitted during a traffic slot at 80 kbps, 40 kbps, 20 kbps, or 10 kbps. At rates of 80 kbps, 40 kbps, and 20 kbps, the packet may include 200 bits (176 bits of data, 8 tail bits, and 16 bits for CRC). At 10 kbps, the packet may include 100 bits (76 bits of data, 8 tail bits, and 16 bits for CRC). QPSK modulation may be used for rates of 80, 40, and 20 kbps, while BPSK modulation may be used for a transmission rate of 10 kbps. At a rate of 80 kbps, the packet may be transmitted for 2.5 ms and a single repeat copy of the packet may be transmitted. At 40 kbps, the packet may be transmitted for 5 ms and 2 repeat copies may be transmitted. Data rates of 20 and 10 kbps may allow the packet to be transmitted for 10 ms and 4 repeat copies of the packet may be transmitted.

Figure 5A:
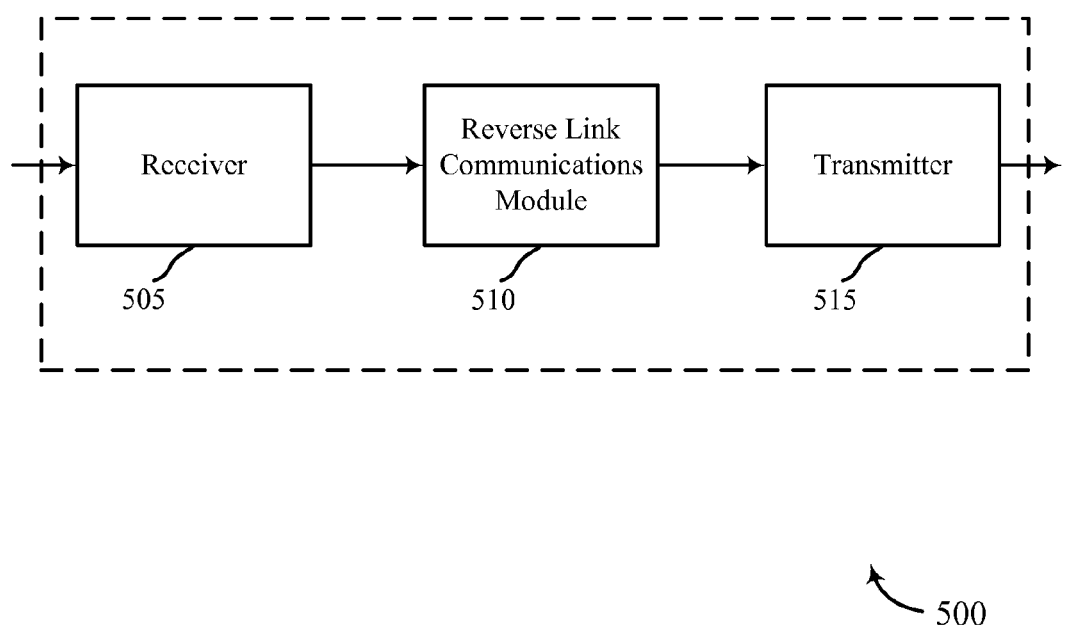
FIG. 5A is a block diagram illustrating a device for managing reverse link communications in accordance with various embodiments.

FIG. 5A is a block diagram illustrating a device 500 for managing reverse link communications in accordance with various embodiments. The device 500 may be an example of one or more aspects of the M2M device 115 described with reference to FIGS. 1, 2, 3A, and/or 3B. The device 500 may also be a processor. The device 500 may include a receiver module 505, a reverse link communications module 510, and/or a transmitter module 515. Each of these components may be in communication with each other.

These components of the device 500 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 505 may receive information such as packet, data, and/or signaling information regarding what the device 500 has received or transmitted. The received information may be decoded, demodulated, and utilized by the reverse link communications module 510 for a variety of purposes.

The receiver module 505 may be configured to receive a forward link physical layer packet sent from a base station 105 using forward link communications 325. The reverse link communications module 510 may generate a reverse link frame that includes a traffic slot during which traffic may be transmitted from an M2M device 115 to a base station 105. In one embodiment, the reverse link frame may not include time slots for reverse link control channels. As a result, physical layer ACK messages may not be transmitted from the M2M device 115 to the base station 105 to indicate the successful decoding and demodulation of a physical layer packet on the forward link. Instead, upon successfully decoding and demodulating the packet, the M2M device 115 may return to a sleep state before sending an ACK message to the base station 105. In another example, the M2M device 115 may return to the sleep state after decoding and demodulating the packet without sending any physical layer ACK message to the base station 105.

In one embodiment, the reverse link communications module 510 may cause communications on the reverse link to terminate early. As previously explained, the forward link frame may include an ACK channel to carry ACK messages from the base station 105 to an M2M device 115 at a high data rate. Upon receiving the ACK message, the reverse link communications module 510 may instruct the transmitter 515 to cease transmitting communications on the reverse link communications 330. Details regarding the reverse link communication module 510 will be described below.

Figure 5B:
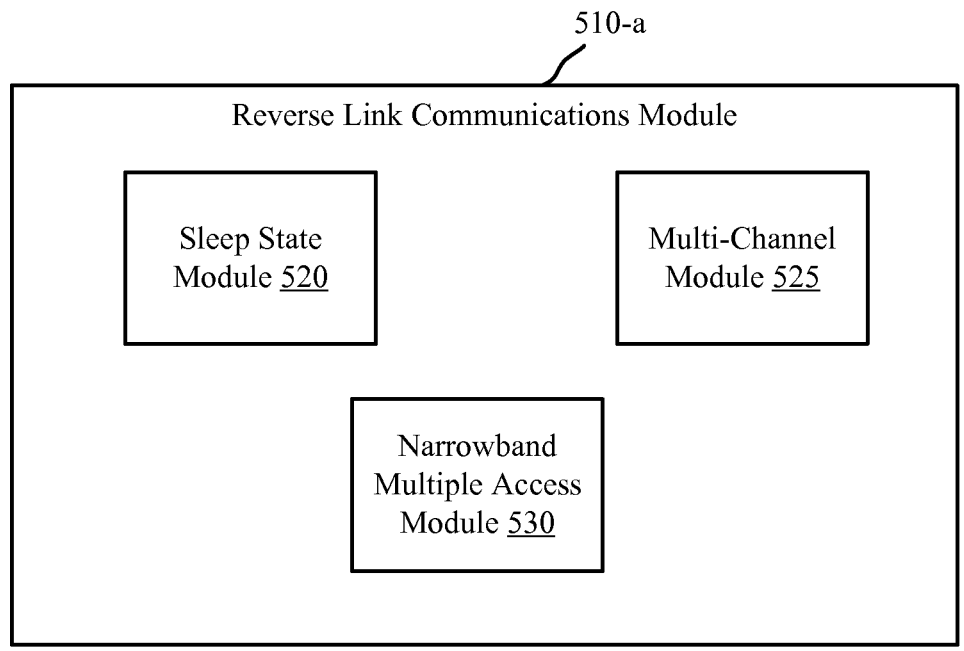
FIG. 5B is a block diagram illustrating one embodiment of a reverse link communications module.

FIG. 5B is a block diagram illustrating one embodiment of a reverse link communications module 510-*a*. The module 510-*a* may be an example of the reverse link communications module of FIG. 5A. In one example, the module 510-*a* may include a sleep state module 520, a multi-channel module 525, and a narrowband multiple access module 530.

In one configuration, the sleep state module 520 may allow an M2M device 115 to wake up and turn on its radio long enough to receive a packet from a base station 105 and then turn off the radio and return to a sleep state as soon as possible to conserve power. The base station may transmit a packet to the M2M device 115 using a forward link frame. The frame may include a time slot during which a packet may be transmitted on a logical channel. The time slot and the channel may be divided into a number of sub-slots and sub-channels. The base station may transmit a copy of the packet during each sub-slot using each sub-channel. In another example, the base station may transmit a copy of the packet during a portion of the sub-slots of the forward link frame. When the M2M device 115 successfully receives a copy of the packet, the sleep state module 520 may cause the M2M device 115 to turn off its radio. After receiving a copy of the packet, the reverse link communications module 510-*a* may attempt to process the received packet by decoding and demodulating the packet. Upon successfully decoding and demodulating the copy of the packet received on one of the sub-channels, the sleep state module 520 may cause the M2M device 115 to return to a sleep state to conserve the battery before a physical layer ACK message is sent back to the base station. The M2M device 115 may return to the sleep state without sending back any ACK message to the base station.

In one embodiment, the multi-channel module 525 may provide a code division multiple access (CDMA) based multiple access scheme to reduce negative effects of an operating rise over thermal (ROT) noise on the reverse link communications 330. In one configuration, the module 525 may divide the operating band of the reverse link into multiple reverse link frequency channels. Within each frequency channel, the module 525 may use CDMA for multiple user multiplexing. Each frequency channel may have its own target ROT operation point. The multi-channel module 525 may dedicate at least one frequency channel as a low data rate random access channel. As a result, the operating ROT may be reduced.

In one example, the narrowband multiple access module 530 may provide a narrowband frequency division multiple access (FDMA) technique for the reverse link communications 330. The module 530 may divide the operating band into a number of narrowband frequency channels. A busy or idle status of each narrowband channel may be broadcasted to each M2M device 115. The devices may contend for a channel selected randomly from the idle set of channels by sending a preamble. The module 530 may allow the M2M device 115 to transmit data only if a channel is either implicitly or explicitly assigned to the M2M device. The module 530 may not allow the transmission to be interrupted if the channel state changes to busy.

Figure 6:
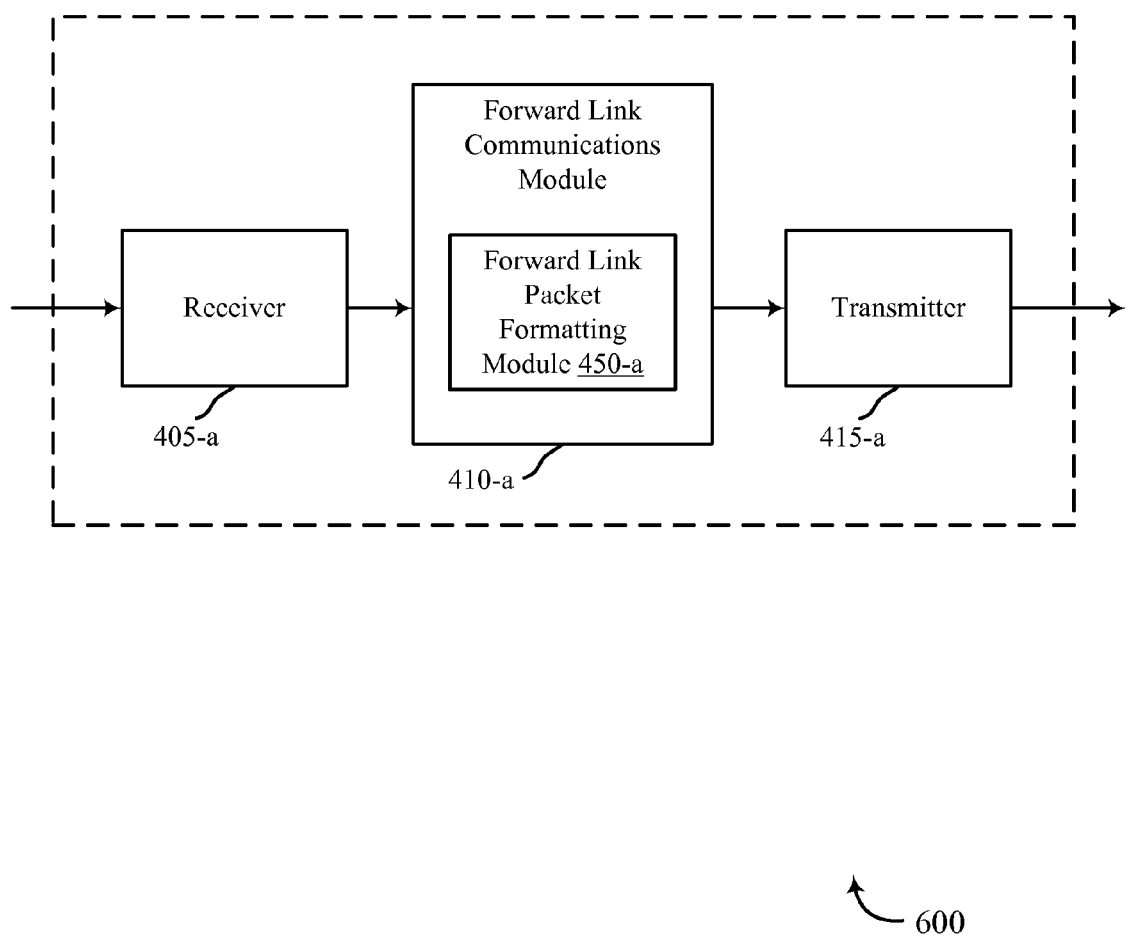
FIG. 6 is a block diagram illustrating a device for managing forward link communications in accordance with various embodiments.

FIG. 6 is a block diagram illustrating a device 600 for managing forward link communications in accordance with various embodiments. The device 600 may be an example of one or more aspects of the base station described with reference to FIGS. 1, 2, 3A, 3B, 4A, and/or 4B. The device 600 may also be a processor. The device 600 may include a receiver module 405-a, a forward link communications module 410-a, and/or a transmitter module 415-a. Each of these components may be in communication with each other.

The components of the device 600 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405-a may receive information such as packet, data, and/or signaling information regarding what the device 600 has received or transmitted. The received information may be utilized by the forward link communications module 410-a for a variety of purposes, as previously described.

In one configuration, the forward link communications module 410-a may include a forward link packet formatting module 450-a. In one embodiment, the module 450-a may be an example of the module 450 described with reference to FIG. 4B. The packet formatting module 450-a may create multiple copies of a packet to be transmitted during a time slot of one or more forward link frames. Details regarding the forward link packet formatting module 450-a will be described below.

Figure 7:
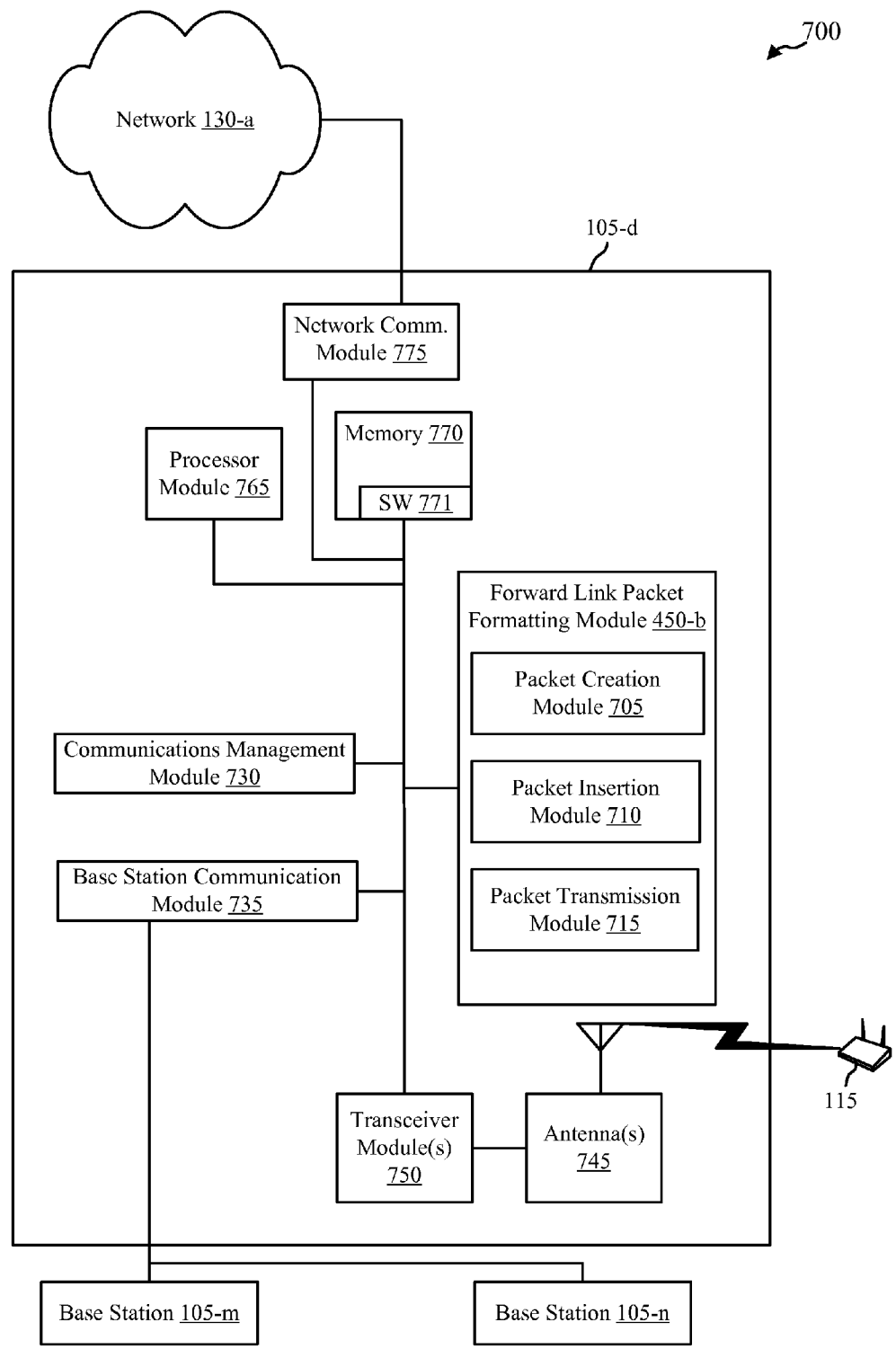
FIG. 7 shows a block diagram of a communications system that may be configured for creating and transmitting multiple copies of a packet during a time slot of a forward link frame to M2M devices in accordance with various embodiments.

FIG. 7 shows a block diagram of a communications system 105-d that may be configured for creating and transmitting multiple copies of a packet during a time slot of one or more forward link frames to M2M devices 115 in accordance with various embodiments. This system 700 may be an example of aspects of the system 100 depicted in FIG. 1, system 200 of FIG. 2, system 300 of FIG. 3A, 320 of FIG. 3B, system 400 of FIG. 4A, and/or system 600 of FIG. 6.

The system 700 may include a base station 105-d. The base station 105-d may include antennas 745, a transceiver module 750, memory 770, and a processor module 765, which each may be in communication, directly or indirectly, with each other (e.g., over one or more buses). The transceiver module 750 may be configured to communicate bi-directionally, via the antennas 745, with an M2M device 115, which may be a sensor, meter, or any other type of device capable of tracking, sensing, monitoring, etc. The transceiver module 750 (and/or other components of the base station 105-d) may also be configured to communicate bi-directionally with one or more networks. In some cases, the base station 105-d may communicate with the core network 130-a through network communications module 775.

Base station 105-d may also communicate with other base stations 105, such as base station 105-m and base station 105-n. Each of the base stations 105 may communicate with the M2M device 115 using different wireless communications technologies, such as different Radio Access Technologies. In some cases, base station 105-d may communicate with other base stations such as 105-m and/or 105-n utilizing base station communication module 735. In some embodiments, base station 105-d may communicate with other base stations through the controller 120 (FIG. 1) and/or core network 130-a.

The memory 770 may include random access memory (RAM) and read-only memory (ROM). The memory 770 may also store computer-readable, computer-executable software code 771 containing instructions that are configured to, when executed, cause the processor module 765 to perform various functions described herein (e.g., forward packet formatting, ACK schemes, dynamic data rate schemes for paging messages, flexible paging schemes, data traffic schemes, etc.). Alternatively, the software 771 may not be directly executable by the processor module 765 but may be configured to cause the computer, e.g., when compiled and executed, to perform functions described herein.

The processor module 765 may include an intelligent hardware device, e.g., a central processing unit (CPU) such as those made by Intel® Corporation or AMD®, a microcontroller, an application-specific integrated circuit (ASIC), etc. The transceiver module 750 may include a modem configured to modulate packets for the M2M device 115 and provide the modulated packets to the antennas 745 for transmission, and to demodulate packets received from the antennas 745. While some examples of the base station 105-d may include a single antenna 745, the base station 105-d preferably includes multiple antennas 745 for multiple links which may support carrier aggregation. For example, one or more links may be used to support macro communications with the M2M device 115.

According to the architecture of FIG. 7, the base station 105-d may further include a communications management module 730. The communications management module 730 may manage communications with other base stations 105. By way of example, the communications management module 730 may be a component of the base station 105-d in communication with some or all of the other components of the base station 105-d via a bus. Alternatively, functionality of the communications management module 730 may be implemented as a component of the transceiver module 750, as a computer program product, and/or as one or more controller elements of the processor module 765.

The components for base station 105-d may be configured to implement aspects discussed above with respect to device 600 in FIG. 6 and may not be repeated here for the sake of brevity. The base station 105-d may include a forward link packet formatting module 450-b, which may be an example of the module 450 described with reference to FIGS. 4B and/or 6. The module 450-b may include a packet creating module 705, a packet insertion module 710, and a packet transmission module 715. In one embodiment, the creation module 705 may create multiple copies of a packet to be transmitted to one or more M2M devices 115 in an M2M wireless WAN. The packet insertion module 710 may insert a single copy of the packet into one or more sub-slots of one or more forward link frames. The packet transmission module 715 may instruct the transceiver module 750 to transmit each copy of the packet during the one or more sub-slots using multiple sub-channels. In one embodiment, some of the modules 705, 710, and 715 may be standalone while others may be incorporated as part of the forward link packet formatting module 450-b.

In some embodiments, the transceiver module 750 in conjunction with antennas 745, along with other possible components of base station 105-d, may transmit a number of forward link frames that each include a number of time slots, from the base station 105-d to the M2M device 115, to other base stations 105-m/105-n, or core network 130-a. Copies of packets may be transmitted during one or more sub-slots of these time slots using one or more sub-channels.

Figure 8:
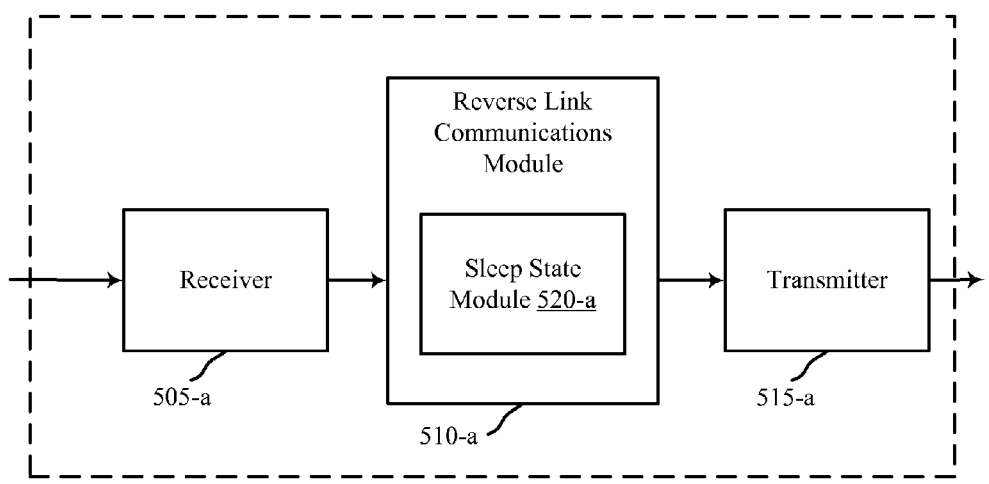
FIG. 8 is a block diagram illustrating a device for managing reverse link communications in accordance with various embodiments.

FIG. 8 is a block diagram illustrating a device 800 for managing reverse link communications in accordance with various embodiments. The device 800 may be an example of one or more aspects of the M2M device 115 and/or the base station 105 described with reference to FIGS. 1, 2, 3A, 3B, and/or 5A. The device 800 may also be a processor. The device 800 may include a receiver module 505-a, a reverse link communications module 510-a, and/or a transmitter module 515-a. The reverse link communications module 510-a may include a sleep state module 520-a. The sleep state module 520-a may be an example of the module 520 described with reference to FIG. 5B. Each of these components may be in communication with each other.

These components of the device 800 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 505-a may receive information such as packet, data, and/or signaling information regarding what the device 800 has received or transmitted. The received information may be utilized by the reverse link communications module 510-a for a variety of purposes.

The receiver module 505-a may be configured to receive a forward link physical layer packet sent from a base station 105 on the forward link. The reverse link communications module 510-a may generate a reverse link frame that includes a traffic slot during which traffic may be transmitted from an M2M device 115 to a base station 105. In one embodiment, the reverse link frame may not include time slots for reverse link control channels. The sleep state module 520-a may cause the M2M device 115 to return to a sleep state and turn off its radio as soon as a packet is successfully received on the forward link. For example, the sleep state module 520-a may cause the M2M device 115 to power down after successfully decoding and demodulating the received packet without transmitting a physical layer ACK message back to the base station 105.

As previously explained, the reverse link communications module 510-a may cause communications on the reverse link to terminate early. The forward link frame may include an ACK channel to carry ACK messages from the base station 105 to an M2M device 115 at a high data rate. Upon receiving the ACK message, the reverse link communications module 510-a may cause the transmitter 515-a to cease transmitting communications on the reverse link communications 330.

Figure 9:
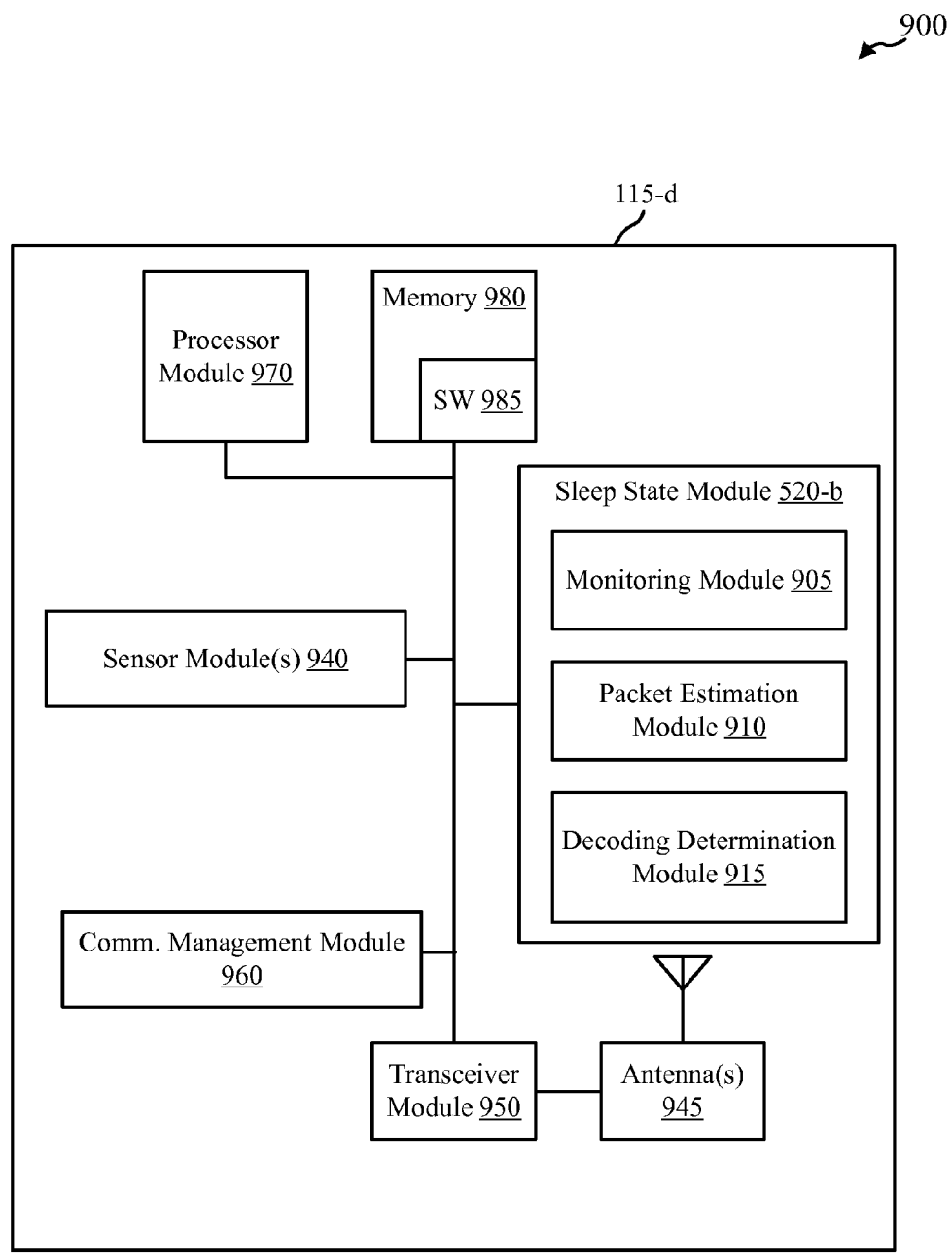
FIG. 9 shows a block diagram of a M2M device to manage reverse link communications in accordance with various embodiments.

FIG. 9 shows a block diagram 900 of a M2M device 115-d to manage reverse link communications in accordance with various embodiments. The M2M device 115-d may have any of various configurations, such as a sensor or monitor for various M2M applications discussed above. The M2M device 115-d may capture or sense information via sensor module(s) 940. The M2M device 115-d may have an internal power supply, such as a small battery, to facilitate mobile operation. In some embodiments, the M2M device 115-d may be the M2M device 115 described with reference to FIGS. 1, 2, 3A, 3B, 5A, and/or 8. The M2M device 115-d may include aspects of device 500 of FIG. 5A and/or device 800 of FIG. 8. The M2M device 115-d may be a multi-mode mobile device. The M2M device 115-d may be referred to as an M2M UE or MTC device in some cases.

The M2M device 115-d may include antenna(s) 945, a transceiver module 950, memory 980, and a processor module 970, which each may be in communication, directly or indirectly, with each other (e.g., via one or more buses). The transceiver module 950 may communicate bi-directionally, via the antenna(s) 945 and/or one or more wired or wireless links, with one or more networks, as described above. For example, the transceiver module 950 may communicate bi-directionally with base stations 105 of FIGS. 1, 2, 3A, 3B and/or 7. Further, the transceiver module 950 may communication with aspects of device 400 of FIG. 4A and/or device 600 of FIG. 6. The transceiver module 950 may include a modem configured to modulate the packets and provide the modulated packets to the antenna(s) 945 for transmission, and to demodulate packets received from the antenna(s) 945. While the M2M device 115-d may include a single antenna 945, the M2M device 115-d may include multiple antennas 945 for multiple transmission links.

The memory 980 may include random access memory (RAM) and read-only memory (ROM). The memory 980 may store computer-readable, computer-executable software code 985 containing instructions that are configured to, when executed, cause the processor module 970 to perform various functions described herein (e.g., receive packets, enter a sleep state, etc.). Alternatively, the software code 985 may not be directly executable by the processor module 970 but be configured to cause the computer (e.g., when compiled and executed) to perform functions described herein. The processor module 970 may include an intelligent hardware device, e.g., a central processing unit (CPU) such as those made by Intel® Corporation or AMD®, an ASIC, a microcontroller, etc.

According to the architecture of FIG. 9, the M2M device 115-d may further include a communications management module 960. The communications management module 960 may manage communications with base stations 105 and/or other M2M devices 115. By way of example, the communications management module 960 may be a component of the M2M device 115-d in communication with some or all of the other components of the M2M device 115-d via a bus. Alternatively, functionality of the communications management module 960 may be implemented as a component of the transceiver module 950, as a computer program product, and/or as one or more controller elements of the processor module 970.

In some embodiments, M2M device 115-d may measure and/or capture data and transmit the data to a network without performing explicit registration on the network. In one embodiment, M2M device 115-d may monitor pilot signals of available base stations or network cells and select a base station or network cell for communication without explicitly registering with the base station or network cell. In some configurations, while not explicitly registered on the selected base station or network cell, M2M device 115-d may monitor system information for the selected base station or network cell. The system information for the selected base station or network cell may include explicit registration triggers and the M2M device 115-d may suppress explicit registration on a network even when one of the explicit registration triggers is detected. For example, the M2M device 115-d may suppress registrations based on one or more registration triggers such as device power up/power down, frequency/band class changes, time period-based registration, movement-based registration, zone-based registration, and/or parameter change based registration.

The system information may include access parameters for use in accessing the selected base station or network cell. The M2M device 115-d may capture or measure information related to an event (e.g., via sensor module(s) 940) and transmit that information to the selected base station or network cell as part of a network access prior to, or without performing, explicit registration on the selected base station or network cell. The network access may be performed using one or more of the access parameters. The M2M device 115-d may be implicitly registered by the selected base station or network cell as part of the network access transmitting the captured or measured event data to the selected base station or network cell.

Suppressing registration may also allow M2M device 115-d to select the best network cell for transmissions without regard to the power penalty incurred in registering with a target cell. For example, M2M device 115-d may select between available networks based on the estimated power consumption for communication with the respective networks without accounting for the power penalty that would be incurred by performing an explicit handover (with an explicit registration on the new network).

The components for M2M device 115-d may be configured to implement aspects discussed above with respect to device 500 of FIG. 5A and/or device 800 of FIG. 8 and may not be repeated here for the sake of brevity. In one example, the M2M device 115-d may include a sleep state module 520-b, which may be an example of the sleep state module 520 described with reference to FIGS. 5B and/or 8. The module 520-b may include a monitoring module 905, a packet estimation module 910, and a decoding determination module 915. In one configuration, the monitoring module 905 may monitor a pilot signal received from a base station 105 to determine the strength of the signal on the forward link. Based on the determined strength of the pilot signal, the packet estimation module 910 may estimate a number of packets that may be required to be transmitted from the base station 105 before the M2M device 115-d is able to successfully decode and demodulate the packet. The decoding determination module 915 may determine when a packet has been decoded and demodulated by the M2M device 115-d. As previously described, when a packet is successfully processed (i.e., decoded and demodulated), the sleep state module 520-b may cause the device 115-d to turn off its radio(s) after a packet is received and if the received packet is decoded and demodulated, the module 520-b may cause the M2M device 115-d to return to a sleep state before sending a physical layer ACK message back to the base station 105. In one configuration, the M2M device 115-d may return to the sleep state without transmitting any physical layer ACK message back to the base station 105 that transmitted the packet.

Figure 10:
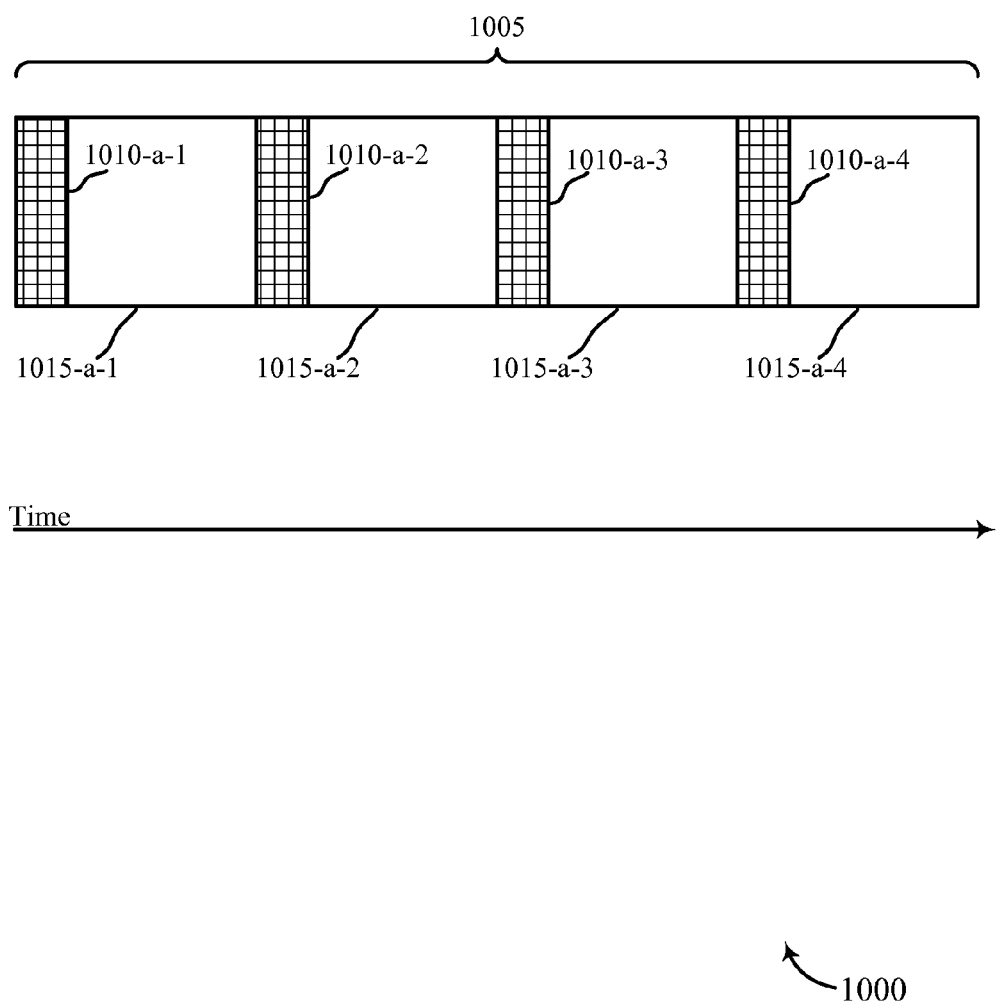
FIG. 10 is a block diagram illustrating one example of transmitting multiple copies of a packet to an M2M device on forward link communications to allow opportunistic decoding of the packet by the M2M device.

FIG. 10 is a block diagram 1000 illustrating one example of transmitting multiple copies of a packet 1010 to an M2M device 115 on forward link communications. The aspects of the block diagram 1000 of FIG. 10 may be carried out by the base station 105 of FIGS. 1, 2, 3A, 3B, 4A, 6, and/or 7.

In one embodiment, a time slot 1005 may be divided into a number of sub-slots 1015. In this example, the time slot 1005 may be divided into 4 sub-slots. A copy of a packet 1010 may be inserted into at least a portion of one sub-slot. Each sub-slot 1015 may include a sub-channel to carry the copies of the packets during the respective sub-slot. In the illustrated example, a copy of the packet 1010 may be inserted into a portion of each sub-slot 1015. During the portion of each sub-slot 1015, the copy of the packet 1010 may be transmitted to an M2M device 115.

In one configuration, the length of the time slot 1005 may be 10 ms. As a result, the length of each individual sub-slot 1015 may be 2.5 ms. In current communication systems, an M2M device 115 may successfully decode and demodulate a received packet before the expiration of the time slot 1005, but may remain in an awake mode until the end of the slot 1005 in order to transmit an ACK message back to the base station 105. This may cause the M2M device 115 to use an unnecessary amount of power to remain in the awake mode during the entire time slot 1005.

In one embodiment, the present systems and methods allow M2M devices to conserve their power by performing opportunistic decoding and demodulation of a packet. In one configuration, an M2M device 115 may enter an awake mode to receive a first copy of a packet 1010-a-1 transmitted during a portion of a first sub-slot 1015-a-1. After receiving the packet, the sleep state module 520 may cause the radio receiver of the M2M device to turn off. The M2M device 115 may attempt to decode and demodulate the received packet. If the M2M device 115 decodes and demodulates the received packet, the sleep state module 520 may cause the device 115 to power down and enter a sleep state even if the time slot 1005 has not yet expired. As a result, the device 115 may enter the sleep state without sending a physical layer ACK message to the base station 105. If the M2M device 115 decodes and demodulates a received copy of the packet 1010 before the expiration of the time slot 1005, power is saved because the device 115 is able to enter the sleep state before the expiration of the time slot 1005 since there is no need to transmit a physical layer ACK message at the conclusion of the time slot 1005.

In one example, if the time slot 1005 is 10 ms and is divided into 4 sub-slots, each having a length of 2.5 ms, the M2M device 115 may be awake for no more than 2.5 ms if it is able to decode and demodulate a first copy of the packet 1010-*a*-1 transmitted during a portion of the first sub-slot 1015-*a*-1. As a result, the device 115 may conserve power by being in the awake mode for no more than 2.5 ms, as opposed to being in the awake mode for the entire duration of the time slot 1005 (e.g., 10 ms).

In one configuration, after a first copy of the packet 1010-*a*-1 is received during a portion of the first sub-slot 1015-*a*-1, the radio receiver of the M2M device may remain powered on until the copy of the packet 1010-*a*-1 is successfully decoded and demodulated. As a result, the radio receiver may also receive a second copy of the packet 1010-*a*-2 during a portion of the second sub-slot 1015-*a*-2 if the first copy 1010-*a*-1 has not yet been decoded and demodulated. The receipt of the second copy of the packet 1010-*a*-2 may further enable the M2M device 115 to decode and demodulate the copy of the packet. Upon successfully processing a copy of the packet, the sleep state module 520 may turn off the radio receiver and power down the M2M device 115. The device 115 may enter the sleep state before the termination of the time slot 1005. In one embodiment, the device 115 may enter the sleep state before transmitting a physical layer ACK message to the base station 105. In one configuration, the device 115 may enter (and remain in) the sleep state without transmitting any physical layer ACK message to the base station 105.

If the M2M device 115 does not decode and demodulate a received first copy of the packet during a portion of a first sub-slot 1015-*a*-1, the device may remain in the awake mode during the remainder of the first sub-slot 1015-*a*-1 and attempt to process a second copy of the packet 1010-*a*-2 received during a portion of a second sub-slot 1015-*a*-2. In another example, if the M2M device 115 is unable to process the first copy of the packet received during the portion of the first sub-slot 1015-*a*-1, the device 115 may power down and enter a temporary sleep state until a portion of the second sub-slot 1015-*a*-2 during which the second copy of the packet 1010-*a*-2 is transmitted.

In one embodiment, the time slot 1005 may be a slot of a single forward link frame. Copies of packets, however, may also be transmitted during portions of sub-slots across multiple forward link frames. For example, a first copy of the packet 1010-*a*-1 may be transmitted during a portion of a first sub-slot 1015-*a*-1 of a first forward link frame. If the M2M device 115 is unable to decode and demodulate the packet, it may return to a sleep state until a second copy of the packet is transmitted. The second copy of the packet may be transmitted during a portion of a sub-slot of a second forward link frame that is different than the first forward link frame.

In one configuration, copies of different packets may be inserted into different portions of a sub-slot. For example, the first copy of a first data packet 1010-*a*-1 may be inserted into a portion of the first sub-slot 1015-*a*-1. The first data packet 1010-*a*-1 may be intended for a first group of one or more specific M2M devices 115. A first copy of a second data packet may be inserted into a different portion of the first sub-slot 1015-*a*-1. The second data packet may be intended for a second group of one or more specific M2M devices 115. As a result, each M2M device 115 may wake up during the portion of the first sub-slot 1015-*a*-1 in which their data packet is transmitted. In another example, the M2M devices 115 may remain awake during each portion of the first sub-slot 1015-*a*-1, instead of being awake for just the portions of the sub-slot 1015-*a*-1 in which their data packet is transmitted.

Figure 11:
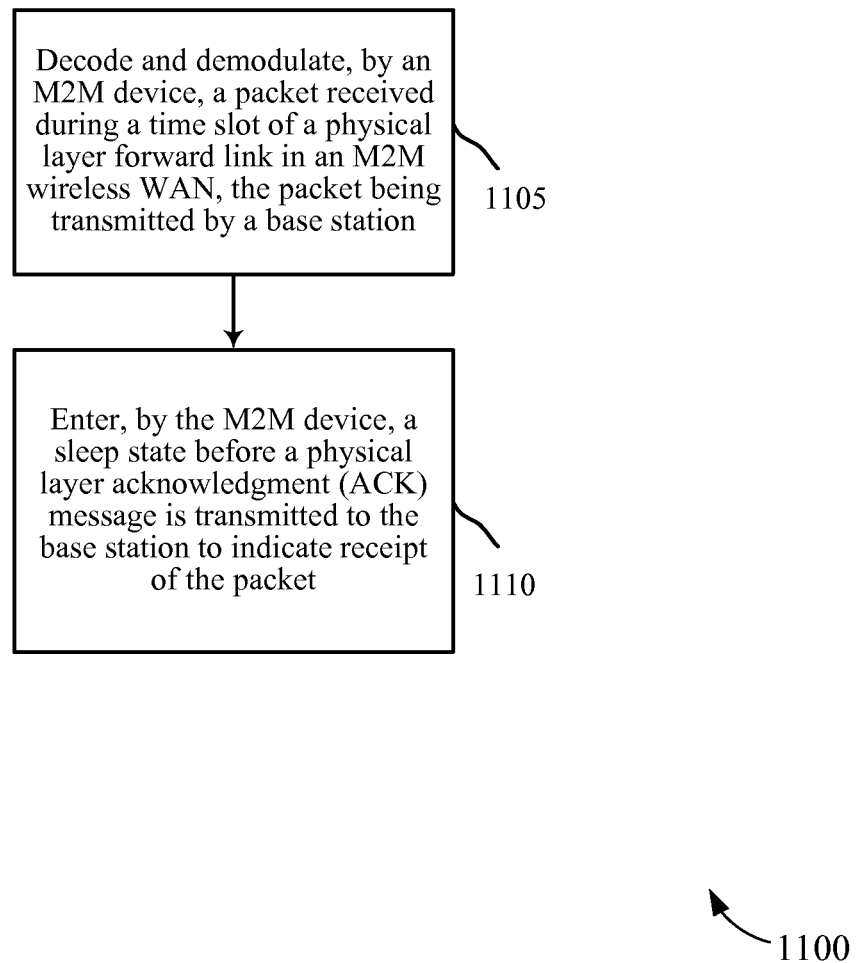
FIG. 11 is a flow chart illustrating one example of a method for managing reverse link communications to conserve power of an M2M device.

FIG. 11 is a flow chart illustrating one example of a method 1100 for managing reverse link communications to conserve power of an M2M device 115. For clarity, the method 1100 is described below with reference to the M2M device 115 shown in FIGS. 1, 2, 3A, 3B, 5A, 8, and/or 9. In one implementation, the sleep state module 520 may execute one or more sets of codes to control the functional elements of the M2M device 115 to perform the functions described below.

At block 1105, a packet may be decoded and demodulated by the M2M device. The packet may be received during a time slot of a physical layer forward link frame in an M2M wireless WAN. The packet may be transmitted by a base station 105. The packet may be received at a high data rate. The packet may be traffic data transmitted during a traffic slot.

At block 1110, the M2M device 115 may enter a sleep state before a physical layer ACK message is transmitted to the base station to indicate receipt of the packet. As a result, power is conserved at the M2M device 115 by turning off the radio(s) of the device 115 and remaining in the sleep state upon successfully decoding and demodulating the packet even if the time slot has not expired.

Therefore, the method 1100 may provide for efficient conservation of power of the M2M device 115. It should be noted that the method 1100 is just one implementation and that the operations of the method 1100 may be rearranged or otherwise modified such that other implementations are possible.

Figure 12:
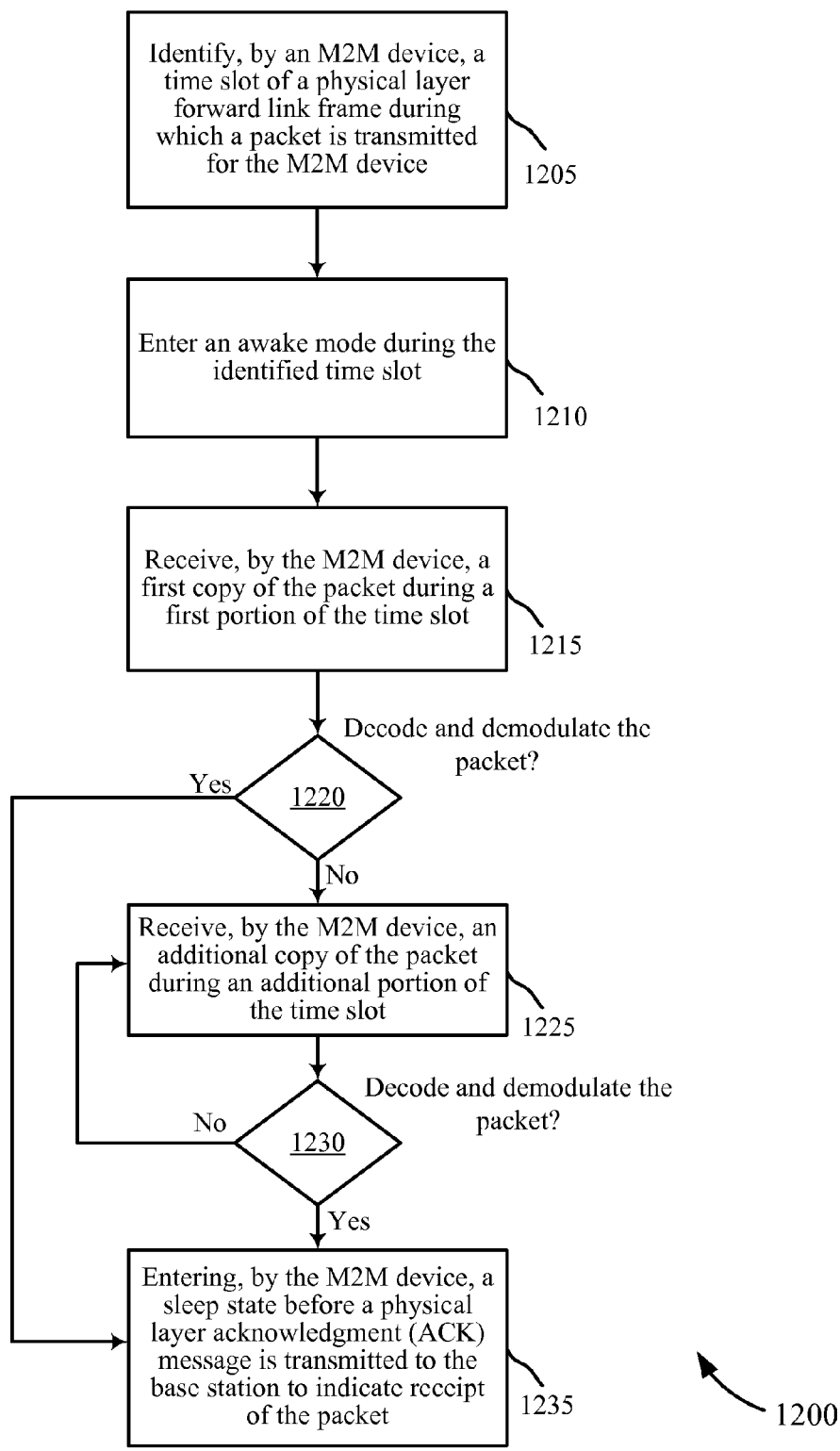
FIG. 12 is a flow chart illustrating one example of a method for conserving power of an M2M device by managing reverse link communications.

FIG. 12 is a flow chart illustrating one example of a method 1200 for conserving power of an M2M device 115 by managing the reverse link communications 330. For clarity, the method 1200 is described below with reference to the M2M device 115 shown in FIGS. 1, 2, 3A, 3B, 5A, 8, and/or 9. In one implementation, the sleep state module 520 may execute one or more sets of codes to control the functional elements of the M2M device 115 to perform the functions described below.

At block 1205, a time slot of a forward link frame may be identified by the M2M device 115. A packet may be transmitted from a base station 105 during the identified time slot that is intended for the M2M device 115. At block 1210, the M2M device 115 may enter an awake mode during the identified time slot. Entering the awake mode may include activating one or more radios of the M2M device 115 to receive the packet transmission from the base station 105 and powering on additional resources of the device 115 to process the received packet.

At block 1215, the M2M device may receive a first copy of the packet during a portion of a first sub-slot of the identified slot. At block 1220, a first determination may be made as to whether the first copy of the packet has been successfully decoded and demodulated. If it is determined at block 1220 that the first copy of the packet is not successfully decoded and demodulated, at block 1225, the M2M device 115 may receive an additional copy of the packet during a portion of an additional sub-slot of the identified slot. At block 1230, a second determination may be made as to whether the additional copy of the packet is successfully processed. If it is not decoded and demodulated, the method 1200 may return to receive another additional copy of the packet transmitted during a portion of another additional sub-slot of the identified slot. In one configuration, the radio(s) of the M2M device 115 may be turned off after each receipt of a copy of the packet. If a received copy is not successfully processed, the radio(s) may be turned back on to receive an additional copy of the packet. In one embodiment, the radio(s) may remain turned on until a received copy is decoded and demodulated.

If, however, it is determined at either block 1220 or block 1230 that a received copy of the packet is successfully processed, the M2M device 115 may enter a sleep state at block 1235, where the resources of the device 115 may be powered down and may not be powered back on during additional sub-slots in which additional copies of the packet are transmitted. In one embodiment, the M2M device 115 may enter the sleep state before a physical layer ACK message is transmitted to the base station to indicate successful receipt, decoding, and demodulation of the packet. In one configuration, no physical layer ACK message may be transmitted to the base station 105 after the M2M device 115 enters the sleep state upon decoding and demodulating the packet.

In one embodiment, the M2M device 115 may read as many copies of the packet as are needed for a successful decoding of the packet and return to the sleep state thereafter. Based on the received signal strength from the pilot, the M2M device 115 may estimate the number of copies it needs to receive in order to successfully decode the packet. As previously stated, the device 115 may turn off its radios after receipt of each copy of the packet while the M2M device 115 attempts to decode and demodulate the packet. In one embodiment, a processing clock of the M2M device 115 may be faster than an input chip rate of the device 115. As a result, the RF radios of the device 115 may remain powered on after successfully receiving a copy of the packet for a small fraction of next sub-slot during which the next copy of the packet is transmitted. The method 1200 conserves power of the M2M device 115 as the device 115 turns on the radio only for the needed duration during a sub-slot to receive a copy of a packet, and the terminal does not need to maintain additional resources in the awake mode until the end of the time slot in order to transmit a physical layer ACK message.

Therefore, the method 1200 may provide for improving the power efficiency of an M2M device 115 by managing reverse link communications of the device 115. It should be noted that the method 1200 is just one implementation and that the operations of the method 1200 may be rearranged or otherwise modified such that other implementations are possible.

Figure 13:
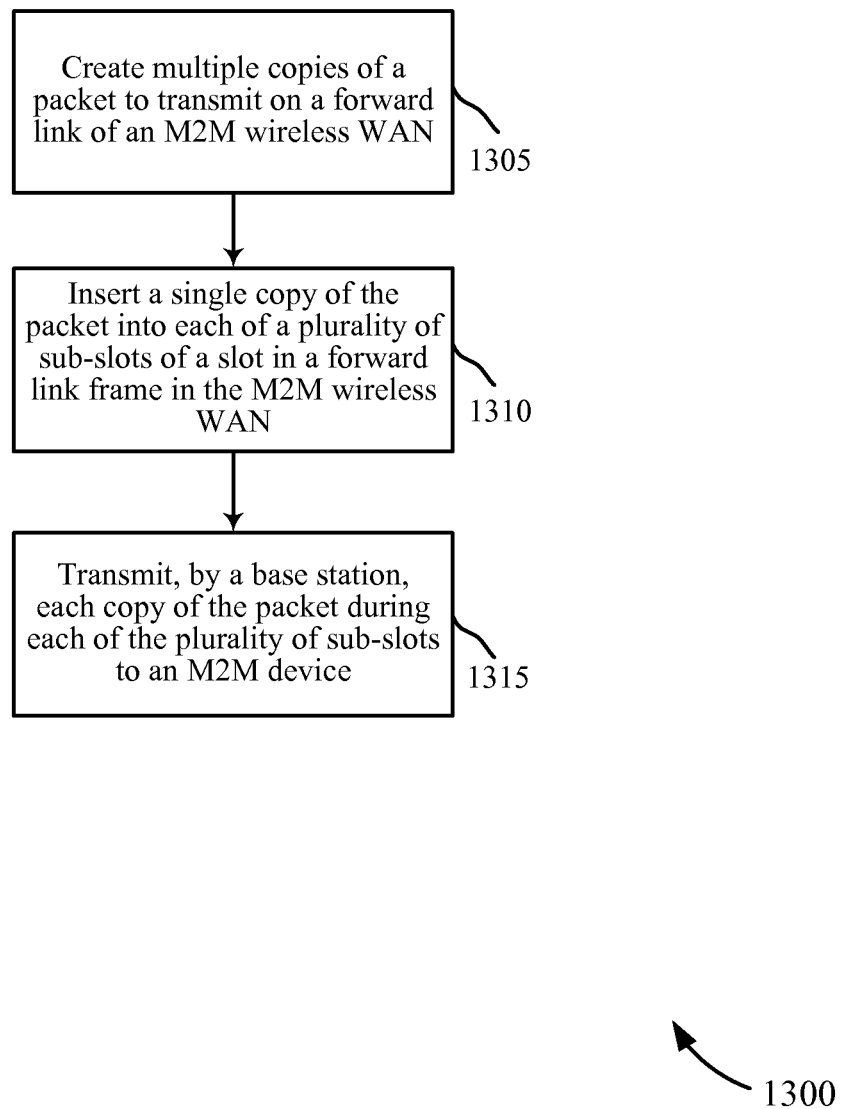
FIG. 13 is a flow chart illustrating one example of a method for conserving power of an M2M device by managing forward link communications.

FIG. 13 is a flow chart illustrating one example of a method 1300 for conserving power of an M2M device 115 by managing forward link communications. For clarity, the method 1300 is described below with reference to the base station 105 shown in FIGS. 1, 2, 3A, 3B, 4A, 6, and/or 7. In one implementation, the forward link packet formatting module 450 may execute one or more sets of codes to control the functional elements of the base station 105 to perform the functions described below.

At block 1305, multiple copies of a packet may be created. The multiple copies of the packet may be transmitted on a forward link of an M2M wireless WAN. At block 1310, a single copy of the packet may be inserted into a portion of one or more sub-slots of a time slot in one or more forward link frames in the M2M wireless WAN. At block 1315, each copy of the packet may be transmitted during the portions of the one or more sub-slots to an M2M device 115. The base station 105 may continue to transmit copies of the packet during portions of sub-slots until a predetermined time period has expired. The time period may be the length of one or more time slots of one or more forward link frames. In one embodiment, the base station 105 may continue to transmit copies of the packet until a predetermined number of copies have been transmitted. The predetermined number of copies of packets to transmit may be determined based on the strength of a signal between the base station 105 and the M2M device 115. In one configuration, the M2M device 115 may estimate the number of copies of the packet that are needed to successfully decode and demodulate the packet. The estimated number of copies may be communicated to the base station 105. The base station 105 may transmit the estimated number of copies of the packet to the M2M device 115.

Therefore, the method 1300 may provide for efficient power conservation of the M2M device 115 by formatting packets on forward link communications. It should be noted that the method 1300 is just one implementation and that the operations of the method 1300 may be rearranged or otherwise modified such that other implementations are possible.

Techniques described herein may be used for various wireless communications systems such as M2M systems, cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies for multiple access in a wireless system such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for machine-to-machine (M2M) wireless communication in a wireless Wide Area Network (WAN), comprising:
   receiving, by an M2M device, a copy of a packet during at least one sub-slot of a physical layer forward link frame in the wireless WAN, copies of the packet being present in a plurality of sub-slots of the physical layer forward link frame;
   deactivating, by the M2M device, one or more radios upon receipt of the copy of the packet and prior to decoding and demodulating the received copy of the packet;
   determining, by the M2M device, a location of an additional copy of the packet during the physical layer forward link frame based at least in part on a determined number of users receiving data in the physical forward link frame and an expected data rate;
   activating, by the M2M device, the one or more radios responsive to a failed decoding and demodulating indication for the received copy of the packet to receive the additional copy of the packet during at least one subsequent sub-slot of the physical layer forward link frame based on the determination; and
   entering, by the M2M device, a sleep state without transmitting a physical layer acknowledgement message responsive to a successful decoding and demodulating indication for the received additional copy of the packet before an end of the physical layer forward link frame.

2. The method of claim 1, wherein no physical layer acknowledgement message is transmitted to indicate receipt of the received additional copy of the packet after entering the sleep state.

3. The method of claim 1, wherein the copies of the packet are included in sub-channels of one or more sub-slots of the plurality of sub-slots of the physical layer forward link frame.

4. The method of claim 1, further comprising:
   remaining in the sleep state for a time period corresponding to a time in which further additional copies of the packet are transmitted during each of the plurality of sub-slots of the physical layer forward link frame.

5. The method of claim 1, further comprising:
   receiving a pilot signal; and
   determining a strength of forward link communications based at least in part on the received pilot signal.

6. The method of claim 5, further comprising:
   estimating a number of copies of the packet that are needed to successfully decode the packet, the estimation based at least in part on the determined strength of the forward link communications.

7. The method of claim 1, wherein the plurality of sub-slots comprises sub-slots including at least one of a paging slot, an acknowledgement slot, or a traffic slot of the physical layer forward link frame.

8. The method of claim 1, further comprising:
   identifying the at least one subsequent sub-slot of the physical layer forward link frame; and
   entering an awake mode during the identified at least one subsequent sub-slot to receive the additional copy of the packet.

9. A machine-to-machine (M2M) device configured for wireless communication in a wireless Wide Area Network (WAN), comprising:

a processor;

memory in electronic communication with the processor; and instructions stored in the memory, the instructions being executable by the processor to:

receive a copy of a packet during at least one sub-slot of a physical layer forward link frame in the wireless WAN, copies of the packet being present in a plurality of sub-slots of the physical layer forward link frame;

deactivate one or more radios upon receipt of the copy of the packet and prior to decoding and demodulating the received copy of the packet;

determine a location of an additional copy of the packet during the physical layer forward link based at least in part on a determined number of users receiving data in the physical forward link frame and an expected data rate;

activate the one or more radios responsive to a failed decoding and demodulating indication for the received copy of the packet to receive the additional copy of the packet during at least one subsequent sub-slot of the physical layer forward link frame based on the determination; and enter a sleep state without transmitting a physical layer acknowledgement message responsive to a successful decoding and demodulating indication for the received additional copy of the packet before an end of the physical layer forward link frame.

10. The M2M device of claim 9, wherein the instructions are further executable by the processor to:

bypass transmission of any physical layer acknowledgement message to indicate receipt of the received additional copy of the packet after the M2M device enters the sleep state.

11. The M2M device of claim 9, wherein the copies of the packet are included in sub-channels of one or more sub-slots of the plurality of sub-slots of the physical layer forward link frame.

12. The M2M device of claim 9, wherein the instructions are further executable by the processor to:

cause the M2M device to remain in the sleep state for a time period corresponding to a time in which further additional copies of the packet are transmitted during each of the plurality of sub-slots of the physical layer forward link frame.

13. The M2M device of claim 9, wherein the instructions are further executable by the processor to:

receive a pilot signal; and determine a strength of forward link communications based at least in part on the received pilot signal.

14. The M2M device of claim 13, wherein the instructions are further executable by the processor to:

estimate a number of copies of the packet that are needed to successfully decode the packet, the estimation based at least in part on the determined strength of the forward link communications.

15. The M2M device of claim 9, wherein the plurality of sub-slots comprises sub-slots including at least one of a paging slot, an acknowledgement slot, or a traffic slot of the physical layer forward link frame.

16. The M2M device of claim 9, wherein the instructions are further executable by the processor to:

identify the at least one subsequent sub-slot of the physical layer forward link frame; and enter an awake mode during the identified at least one subsequent sub-slot to receive the additional copy of the packet.

17. An apparatus configured for machine-to-machine (M2M) wireless communication in a wireless Wide Area Network (WAN), comprising:

means for receiving a copy of a packet during at least one sub-slot of a physical layer forward link frame in the wireless WAN, copies of the packet being present in a plurality of sub-slots of the physical layer forward link frame; and means for deactivating one or more radios upon receipt of the copy of the packet and prior to decoding and demodulating the received copy of the packet;

means for determining a location of an additional copy of the packet during the physical layer forward link frame based at least in part on a determined number of users receiving data in the physical forward link frame and an expected data rate;

means for activating the one or more radios responsive to a failed decoding and demodulating indication for the received copy of the packet to receive the additional copy of the packet during at least one subsequent sub-slot of the physical layer forward link frame based on the determination; and means for entering a sleep state without transmitting a physical layer acknowledgement message responsive to a successful decoding and demodulating indication for the received additional copy of the packet before an end of the physical layer forward link frame.

18. The apparatus of claim 17, further comprising:

means for bypassing a transmission of any physical layer acknowledgement message to indicate receipt of the received additional copy of the packet after the apparatus enters the sleep state.

19. The apparatus of claim 17, wherein the copies of the packet are included in sub-channels of one or more sub-slots of the plurality of sub-slots of the physical layer forward link frame.

20. The apparatus of claim 17, further comprising:

means for remaining in the sleep state for a time period corresponding to a time in which further additional copies of the packet are transmitted during each of the plurality of sub-slots of the physical layer forward link frame.

21. The apparatus of claim 17, further comprising:

means for receiving a pilot signal; and means for determining a strength of forward link communications based at least in part on the received pilot signal.

22. The apparatus of claim 21, further comprising:

means for estimating a number of copies of the packet that are needed to successfully decode the packet, the estimation based at least in part on the determined strength of the forward link communications.

23. The apparatus of claim 17, wherein the plurality of sub-slots comprises sub-slots including at least one of a paging slot, an acknowledgement slot, or a traffic slot of the physical layer forward link frame.

24. The apparatus of claim 17, further comprising:

means for identifying the at least one subsequent sub-slot of the physical layer forward link frame; and means for entering an awake mode during the identified at least one subsequent sub-slot to receive the additional copy of the packet.

25. A non-transitory computer-readable medium storing instructions for machine-to-machine (M2M) wireless communication in a wireless Wide Area Network (WAN), the instructions executable by a processor to:

receive a copy of a packet during at least one sub-slot of a physical layer forward link frame in the wireless WAN, copies of the packet being present in a plurality of sub-slots of the physical layer forward link frame;
deactivate one or more radios upon receipt of the copy of the packet and prior to decoding and demodulating the received copy of the packet;
determine a location of an additional copy of the packet during the physical layer forward link frame based at least in part on a determined number of users receiving data in the physical forward link frame and an expected data rate;
activate the one or more radios responsive to a failed decoding and demodulating indication for the received copy of the packet to receive the additional copy of the packet during at least one subsequent sub-slot of the physical layer forward link frame based on the determination; and
enter a sleep state without transmitting a physical layer acknowledgement message responsive to a successful decoding and demodulating indication for the received additional copy of the packet before an end of the physical layer forward link frame.

26. The non-transitory computer-readable medium of claim 25, wherein the instructions are further executable by the processor to:
bypass transmission of any physical layer acknowledgement message to indicate receipt of the received additional copy of the packet after the M2M device enters the sleep state.

27. The non-transitory computer-readable medium of claim 25, wherein the copies of the packet are included in sub-channels of one or more sub-slots of the plurality of sub-slots of the physical layer forward link frame.

28. The non-transitory computer-readable medium of claim 25, wherein the instructions are further executable by the processor to:
cause the M2M device to remain in the sleep state for a time period corresponding to a time in which further additional copies of the packet are transmitted during each of the plurality of sub-slots of the physical layer forward link frame.

29. A method for machine-to-machine (M2M) wireless communication in a wireless Wide Area Network (WAN), comprising:
receiving, by an M2M device, a pilot signal;
determining, by the M2M device, a strength of forward link communications based at least in part on the pilot signal;
estimating, by the M2M device, a number of copies of a packet that are needed to successfully decode the packet based at least in part on the strength of the forward link communications;
receiving, by the M2M device, the number of copies of the packet during at least one sub-slot of a plurality of sub-slots of a physical layer forward link frame in the wireless WAN; and
entering, by the M2M device, a sleep state responsive to a successful decoding and demodulating indication for the packet before an end of the physical layer forward link frame.

30. The method of claim 29, wherein entering the sleep state comprises:
entering the sleep state without transmitting a physical layer acknowledgement message.

31. The method of claim 29, wherein no physical layer acknowledgement message is transmitted to indicate receipt of the packet after entering the sleep state.

32. The method of claim 29, wherein the copies of the packet are included in sub-channels of one or more sub-slots of the plurality of sub-slots of the physical layer forward link frame.

33. A machine-to-machine (M2M) device configured for wireless communication in a wireless Wide Area Network (WAN), comprising:
a processor;
memory in electronic communication with the processor; and
instructions stored in the memory, the instructions being executable by the processor to:
receive a pilot signal;
determine a strength of forward link communications based at least in part on the pilot signal;
estimate a number of copies of a packet that are needed to successfully decode the packet based at least in part on the strength of the forward link communications;
receive the number of copies of the packet during at least one sub-slot of a plurality of sub-slots of a physical layer forward link frame in the wireless WAN; and
enter a sleep state responsive to a successful decoding and demodulating indication for the packet before an end of the physical layer forward link frame.

34. The M2M device of claim 33, wherein the instructions to enter the sleep state are further executable by the processor to:
enter the sleep state without transmitting a physical layer acknowledgement message.

35. The M2M device of claim 33, wherein the instructions are further executable by the processor to:
bypass transmission of any physical layer acknowledgement message to indicate receipt of the packet after the M2M device enters the sleep state.

36. The M2M device of claim 33, wherein the copies of the packet are included in sub-channels of one or more sub-slots of the plurality of sub-slots of the physical layer forward link frame.

* * * * *